(12) United States Patent
Sonnenburg

(10) Patent No.: US 8,795,746 B2
(45) Date of Patent: Aug. 5, 2014

(54) THERAPEUTIC USE OF MUCIN GLYCANS

(75) Inventor: Justin L. Sonnenburg, Redwood City, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 30 days.

(21) Appl. No.: 13/397,556

(22) Filed: Feb. 15, 2012

(65) Prior Publication Data

US 2012/0207882 A1 Aug. 16, 2012

Related U.S. Application Data

(60) Provisional application No. 61/463,465, filed on Feb. 16, 2011.

(51) Int. Cl.
| | | |
|---|---|---|
| A23C 9/20 | (2006.01) | |
| A23L 1/30 | (2006.01) | |
| C13K 13/00 | (2006.01) | |

(52) U.S. Cl.
USPC .................. 426/71; 426/72; 536/123.1

(58) Field of Classification Search
USPC ............................................ 426/71
See application file for complete search history.

(56) References Cited

U.S. PATENT DOCUMENTS

| | | | |
|---|---|---|---|
| 6,180,779 B1 | 1/2001 | Parekh et al. | |
| 2006/0014717 A1 | 1/2006 | Angstrom et al. | |
| 2007/0275881 A1* | 11/2007 | Morrow et al. | 514/8 |
| 2008/0125346 A1* | 5/2008 | Beermann et al. | 514/2 |
| 2009/0035813 A1 | 2/2009 | Sprenger et al. | |

OTHER PUBLICATIONS

NPL: Comstock LE entitled Importance of Glycans to the Host-Bacteroides mutualism in the mammalian intestine in Cell Host & Microbe 5: 522-526, 2009.*
NPL: Robbe et al. Biochem J 384: 307-316, 2004.*
NPL: Palmer C et al. PLoS Biology 5(7): e 177, 2007.*
NPL: Martens et al., iin Cell Host and Microbe 4: 447-457, 2008.*
Backstrom; et al., "Recombinant MUC1 mucin with a breast cancer-like O-glycosylation produced in large amounts in Chinese-hamster ovary cells", Biochem. J. (2003), 376:677-686.
Batra; et al., "Transfection of the human Muc 1 mucin gene into a poorly differentiated human pancreatic tumor cell line, Panel: integration, expression and ultrastructural changes", J. Cell. Sci. (1991), 100:841-9.
Bhavanandan; et al., "Purification and characterization of the MUC1 mucin-type glycoprotein, epitectin, from human urine: structures of the major oligosaccharide alditols", Glycoconjugate Journal (1998), 15:37-49.
Booijink; et al., "Metatranscriptome Analysis of the Human Fecal Microbiota Reveals Subject-Specific Expression Profiles, with Genes Encoding Proteins Involved in Carbohydrate Metabolism Being Dominantly Expressed", Applied and Environmental Microbiology (2010), 76(16):5533-5540.
Dabbagh; et al., "IL-4 Induces Mucin Gene Expression and Goblet Cell Metaplasia In Vitro and In Vivo", J. Immunol. (1999), 162:6233-7.

(Continued)

*Primary Examiner* — Humera Sheikh
*Assistant Examiner* — Bhaskar Mukhopadhyay
(74) *Attorney, Agent, or Firm* — Bozicevic, Field & Francis LLP; Pamela J. Sherwood

(57) ABSTRACT

A therapeutic formulation containing mucin glycans derived from one or a number of nutritionally appropriate sources is described.

7 Claims, 18 Drawing Sheets
(18 of 18 Drawing Sheet(s) Filed in Color)

(56) References Cited

OTHER PUBLICATIONS

Deshmukh; et al., "Acrolein-Activated Matrix Metalloproteinase 9 Contributes to Persistent Mucin Production", Am. J. Pathol. (2008), 38:446-54.

Glenister; et al., "Enhanced Growth of Complex Communities of Dental Plaque Bacteria in Mucin-Limited Continuous Culture", Microbial Ecology in Heath and Disease (1988), 1:31-38.

Kim; et al., "Interleukin-1beta Induces MUC2 and MUC5AC Synthesis through Cyclooxygenase-2 in NCI-H292 Cells", Molecular Pharmacology (2002), 62(5):1112-1118.

Link; et al., "Bioprocess development for the production of a recombinant MUC1 fusion protein expressed by CHO-KI cells in protein-free medium", Journal of Biotechnology (2004), 110:51-62.

Marcobal; et al., "Bacteroides in the Infant Gut Consume Milk Oligosaccharides via Mucus-Utilization Pathways", Cell Host & Microbe (2011), 10:507-514.

Sonnenburg; et al., "Specificity of polysaccharide use in intestinal Bacteroides species determines diet-induced microbiota alterations", Cell (2010), 141(7):1241-1252.

\* cited by examiner

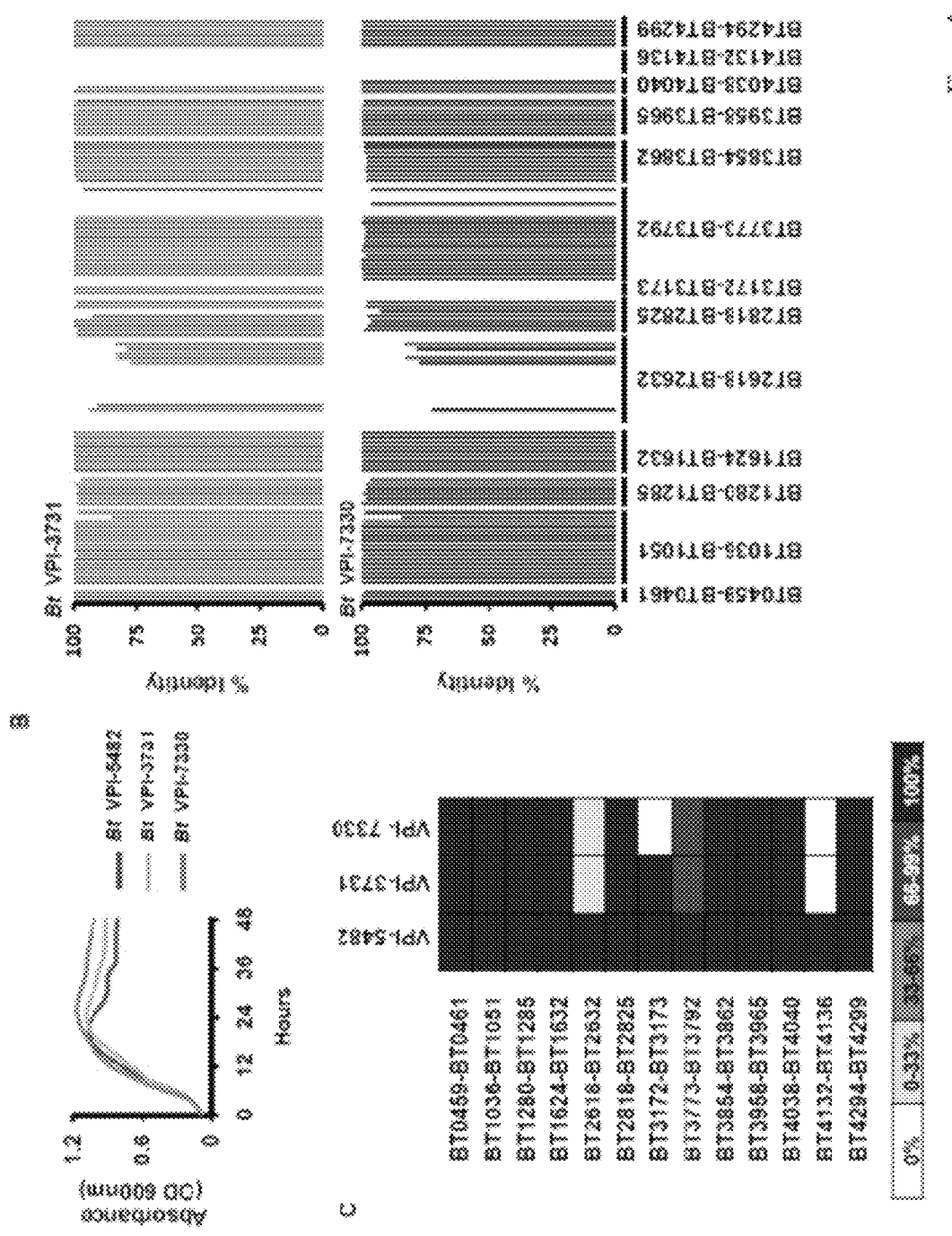

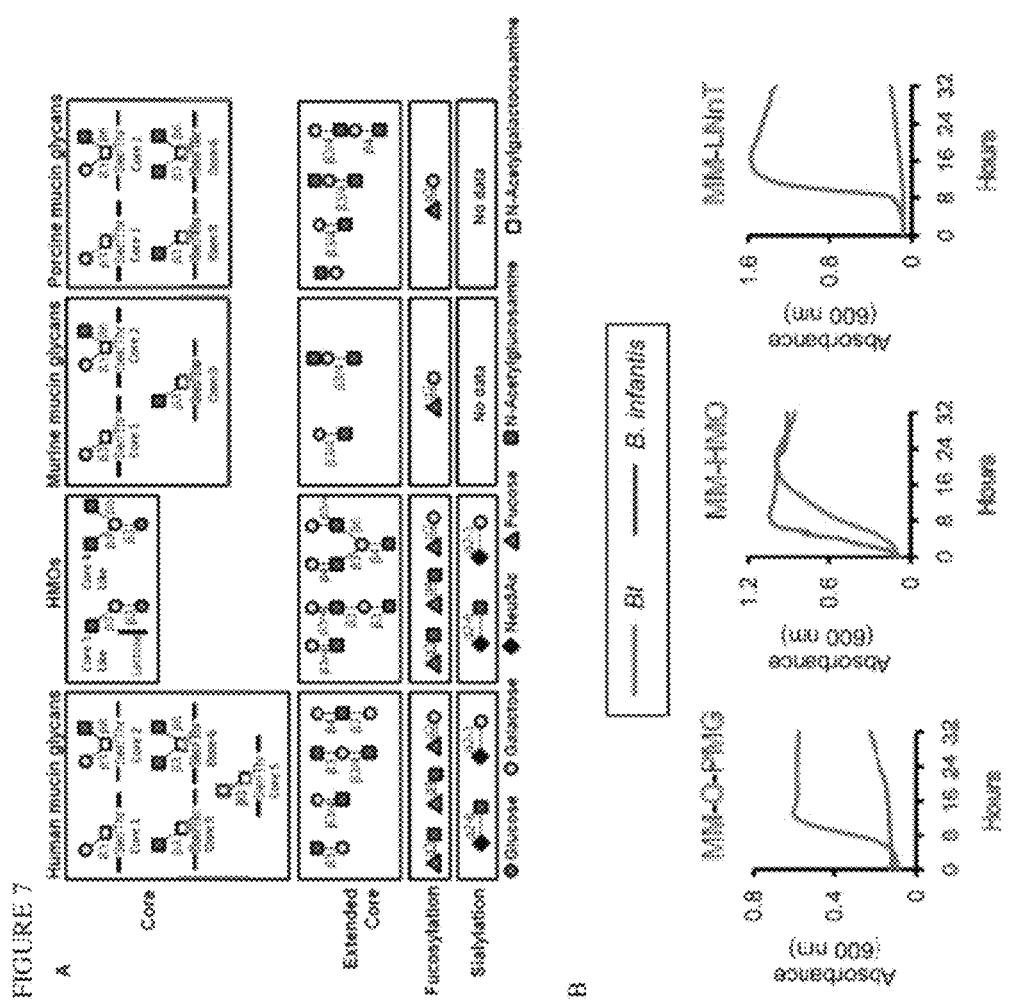

THERAPEUTIC USE OF MUCIN GLYCANS

FEDERALLY SPONSORED RESEARCH AND DEVELOPMENT

This invention was made with Government support under grant R01 DK085025 awarded by the National Institutes Health. The Government has certain rights in this invention.

FIELD OF THE INVENTION

The present invention relates generally to nutritional supplements containing mucin glycans and methods for manufacturing such supplements.

BACKGROUND OF THE INVENTION

Oligosaccharides are food products with interesting nutritional properties. They may be naturally present in food, mostly in fruits, vegetables or grains, or produced by biosynthesis and/or purification from natural sugars or polysaccharides and added to food products because of their nutritional properties. Resistance to enzymatic reactions that occur in the upper part of the gastrointestinal tract allows oligosaccharides to become 'colonic nutrients' for gut microbiota, as some resident intestinal bacterial species express enzymes that enable oligosaccharide harvest and metabolism by fermentation. Oligosaccharides that selectively promote the growth of a bacterial species of interest and thus equilibrate intestinal microbiota may be referred to as prebiotics.

The normal microbiota of humans is exceedingly complex, and varies by individual depending on genetics, age, sex, stress, nutrition and diet of the individual. It has been calculated that a human adult houses about $10^{12}$ bacteria on the skin, $10^{10}$ in the mouth, and $10^{14}$ in the gastrointestinal tract. The latter number is far in excess of the number of eucaryotic cells in all the tissues and organs which comprise a human.

The microbiota of the gut perform many metabolic activities, and influence the physiology of the host. Bacteria make up the majority of the gut microbiota, although it includes anaerobic members of archaea and eukarya. The majority of these microbes are obligate anaerobes, and a small percentage facultative anaerobes. It is estimated that between 300 and 1000 different species live in the gut, however, it is known that a smaller number of species dominate. Most belong to either the Firmicutes or Bacteroidetes phyla. Common genera include: *Bacteroides, Clostridium, Fusobacterium, Eubacterium, Ruminococcus, Peptococcus, Peptostreptococcus, Akkermansia, Faecalibacterium, Roseburia,* and *Bifidobacterium*. Species from the genus *Bacteroides* alone constitute about 30% of all bacteria in the gut, suggesting that this genus is especially important in the functioning of the host.

Without gut microbiota, the human body would be unable to utilize some of the undigested carbohydrates it consumes, because some members of gut microbiota have enzymes that human cells lack for breaking down certain polysaccharides. Carbohydrates that humans cannot digest without bacterial help include certain starches, fiber, oligosaccharides and sugars that are not digested and absorbed in the upper portion of the GI tract, e.g. lactose in the case of lactose intolerance and sugar alcohols, mucus produced by the gut, and many types of complex dietary plant polysaccharides. Bacteria turn carbohydrates they ferment into short chain fatty acids, or SCFAs. These materials can be used by host cells, providing a major source of useful energy and nutrients for humans. SCFAs increase the gut's absorption of water, reduce counts of damaging bacteria, increase growth of human gut cells, and potentiate the growth of indigenous syntrophic bacteria. Evidence also suggests that bacteria enhance host absorption and storage of lipids. Changing the numbers and species of gut microbiota can alter community function and interaction with the host.

Human breast milk contains several different classes of molecules that perform numerous biological roles for the nursing infant, including providing calories and other nutrients. One of the most abundant classes of molecules in human milk is the milk oligosaccharides, a family of ~200 structurally related carbohydrates. When consumed by the infant milk, milk oligosaccharides pass to the distal portion of the digestive tract undigested. Milk oligosaccharides are able to serve as a carbon and energy source for the developing consortium of microbes that assemble in the infant intestine shortly after birth.

Infant formula has been widely used throughout the world as a substitute for mothers' milk to feed infants. One of the major challenges of formulating a synthetic food for infants is mimicking the properties of human milk. While simple molecules such as lactose, amino acids/proteins, and vitamins are readily available for addition to formula, some important bioactive molecules, such as milk oligosaccharides, are not readily obtained in large quantities, and therefore are not typically added.

SUMMARY OF THE INVENTION

Therapeutic formulations are provided, which formulations comprise a dose of mammalian mucin glycans effective in stimulating growth of desirable gut microorganisms. The mucin glycans may be purified from mucin glycoproteins. Formulations of interest include, without limitation, nutritional supplements, which in some embodiments are infant formula supplements; nutriceuticals, enriched food products, etc., and other purified forms of mammalian mucin glycans suitable for oral ingestion.

Gut microorganisms with growth stimulated by the therapeutic compositions of the invention may include, without limitation, species of *Bacteroides*, e.g. *Bacteroides thetaiotamicron, Bacteroides fragilis, Bacteroides caccae, Bacteroides vulgatus, Bacteroides ovatus, Bacteroides stericoris*, etc.

The source of the mucin glycoproteins may be a non-human animal, such as large domesticated mammals, e.g. porcine, bovine, etc., including gut-derived mucin glycoproteins. Alternatively human mucin glycans may be prepared from cell culture. The mucin glycans may be formulated in combination with natural or synthetic human milk oligosaccharides, optionally in combination with other components of milk.

In some embodiments the therapeutic formulation is a nutritional food supplement suitable for an infant formula that, when added to a conventional infant formula is nutritionally complete and suitable to support normal growth and development of infants and children. Specifically, such a composition includes one or a combination of nutritionally appropriate source(s) of mucin glycans. The level of mucin glycans in the formula is designed to mimic the complex milk oligosaccharides found in breast milk over the period of 0-24 months of lactation, e.g. in a dose of from about 0.1 g/liter to about 25 g/liter.

In some embodiments, the invention provides a composition and a method of adding purified mucin glycans to any number of milk protein-based formulas, both with and without lactose, non-milk-based formulas, including soy protein-based formulas, amino acid formulas, and rice protein formulas. The nature and novelty of the invention involves the non-obvious addition of mucin glycans to formula, and the appropriate selection of mucin glycans to achieve both appropriate levels as well as appropriate nutrients for specific infant and children's formulas.

In other embodiments the therapeutic formulation is a nutritional supplement useful as a prebiotic, where the nutritional supplement comprises mammalian mucin glycans, which may be isolated from the protein component of mucin glycoproteins, and which is provided in a dose and formulation effective in stimulating growth of desirable gut microorganisms. The supplement may be provided in liquid or dried form, and may be formulated with proteins, simple or complex sugars, fats, etc. to achieve the desired prebiotic effect. It is shown herein that human milk oligosaccharides are consumed by bacterial residents of the intestine via the same pathways the bacteria use to consume mucin glycans, the carbohydrates that are secreted in mucus, as evidenced by an upregulation of specific polysaccharide utilization loci. A close comparison of the known structures of milk oligosaccharides and mucin glycans reveals a high degree of structural similarity between these two families of molecules. A use of mammalian mucin glycans in the preparation of human nutritional supplements is provided. Mucin glycans can be readily released and purified from the mucin proteins and added as nutritional supplements to infant formula, neutraceuticals and prebiotics, etc. to mimic the function of human milk oligosaccharides as well as to promote mucus-adapted beneficial members of the resident microbiota.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6. *B. fragilis* response to HMO includes sialic acid catabolism. A) susC/susD homologs in *B. fragilis* that are up regulated in vitro in MM-HMO relative to MM-glucose. Fold-change values for HMO growth are shown to the right. B) Genomic organization of *B. fragilis* sialic acid-use loci. Grey boxes correspond to those genes up regulated ≥5 fold in MM-HMO compared to MM-glucose. C) Neu5Ac content in MM-HMO and in MM-HMO after *B. fragilis* growth, determined by using DMB-derivatization followed by reverse phase HPLC. D) Fold-induction of fucosidase genes from *B. fragilis* grown in MM-O-PMG and MM-HMO relative to growth in MM-glucose as measured by q-RT-PCR. Error bars represent standard error for three biological replicates.

DEFINITIONS

Figure 1:
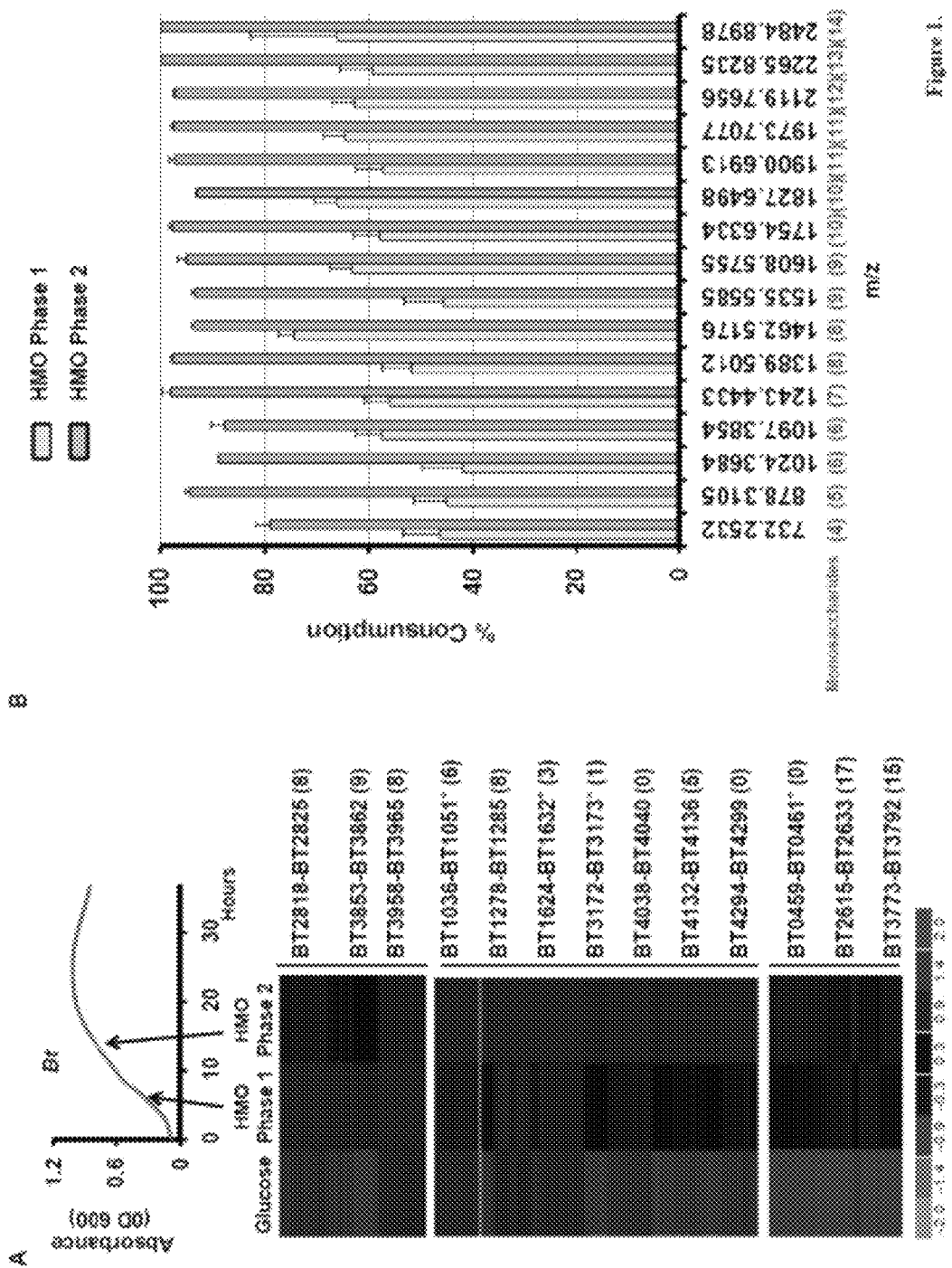
FIG. 1. Bt up regulates numerous PULs during its consumption of diverse HMO structures. A) Transcriptional profiles of Bt PULs induced during growth in MM-HMO at two time points (arrows) compared to growth in MM-glucose. Colors indicate deviations above (red) and below (green) a gene's average expression across the samples. Only PULs significantly up regulated with an average fold-change ≥5 relative to growth in MM-glucose are shown. Number of genes in Bt's 105 gene signature are indicated in parentheses. These genes represent the structural complexity of HMO and are not induced in MM-galactose or MM-lactose. *, partial PUL. B) HMO consumption profiles of Bt at the two time-points shown in panel (A), determined using MALDI-FTICR-MS. Discrete mass to charge ratios (m/z) correspond to a characteristic oligosaccharide; number of monosaccharides for each mass are indicated in parentheses.

Mucin glycoproteins. Mucin glycoproteins are gel-forming polypeptides that serve as a dense, protective barrier on cell surfaces. This mucosal barrier formed by mucin glycoproteins prevents the entrance of pathogens and large macromolecules into the cell, assists with the transport of proteins needed for the growth and repair of the epithelium, and facilitates the retention of water at mucosal surfaces. These molecules also play an important role in the intestine in serving as food and attachment sites for the resident microbiota. Carbohydrates may contribute, e.g., 50-90% of the total molecular weight of a mucin glycoprotein.

Mucins are a diverse family. Domains within the protein core are rich in threonine, serine and hydroxyproline enabling post-translational O-glycosylation. The highly glycosylated properties of mucins make them resistant to proteolysis and able to hold water. Mucins also contain cysteine-rich regions that participate in intermolecular cross-linking and are typically secreted as large aggregates. Mucins may also be associated with membranes and may serve as receptor-like ligands for carbohydrate-binding molecules.

Mucin glycoproteins useful in the methods, compositions, and kits described herein may be purified from natural sources (e.g., porcine stomach or bovine submaxillary glands). Partially purified mucin glycoproteins are available commercially from, e.g., Sigma-Aldrich (Catalog Nos. M1778, M2378, M3895, M4503; St. Louis, Mo., USA), or may be obtained by methods known to those of skill in the art, for example as described by Glenister and Salmon, K. *Microbial Ecol. in Health & Disease* 1, 31, (1988) (from pork stomach); or Deshmukh et al. *Am. J. Pathol.* 38, 446-54, (2008) (from bovine submaxillary gland).

Mucin glycoproteins may also be produced in recombinant or non-recombinant cells lines. The overexpression of recombinant mucins is described in, e.g., Backstrom et al., Biochem. J. 376:677-86, 2003; Batra et al., J. Cell. Sci. 100:841-9, 1991; Dabbagh et al., J. Immunol. 162:6233-7, 1999; Kim et al., Mol. Pharmacol. 62:1112-8, 2002; and Link et al., J. Biotechnology 110:51-62, 2004, hereby incorporated by reference. Mucin glycoproteins may be extracted and isolated from recombinant and non-recombinant cell lines, as described in, e.g., Davies and Carlstedt, Methods Mol. Biol. in Glycoprotein Methods and Protocols, 125:3-13, 2000; Carraway, Methods Mol. Biol. in Glycoprotein Methods and Protocols, 125:15-26, 2000; and Bhavanandan et al., Glycoconjugate J., 15:37-49, 1998, hereby incorporated by reference. Characterization of isolated mucin glycoproteins may be accomplished using, e.g., solution assays, gel assays (e.g., SDS-PAGE), membrane-bound methods, antibodies, enzyme-linked immuno-sorbent assays (ELISA), or liquid-chromatography electron-spray ionization mass spectrometry (LCMS).

Porcine gastric mucin, or other types of mammalian buccal and gastrointestinal mucins, including bovine gastric mucin and bovine and porcine salivary mucins are obtainable as a by-product from manufacturing purposes, e.g. in the production of pepsin from hog stomachs. When porcine gastric mucin is to be used for the purpose of the present invention, it may be subjected to additional purification. Such additional purification may be obtained by several alcohol precipitations, such as 2-3 precipitations with 60% ethanol.

Mucin glycans. Mucin glycans are typically built upon an N-acetylgalactosamine that is O-linked to serine and threonine residues of the mucin protein, and the most abundant are based on five different core structures. Structures very similar to human mucin glycans are found in the porcine and mouse mucin glycans. In both the intestinal mucins and in HMOs, repeated motifs containing galactose and N-acetylglucosamine are present and terminate with fucose and sialic acid residues. Sequencing of glycans may be performed, for example as described by Thomsson et al. (2000) Anal Chem. 2000 Oct. 1; 72(19):4543-9.

The mucin glycans are a highly heterogenous mixture, comprising linear and branched oligosaccharides from about 2 to about 10 monosaccharide subunits in length, usually including galactose, N-acetylgalactosamine, fucose, glucose and N-acetylglucosamine, with heterogenous linkages within any one glycan, e.g. a mixture of α2-3, α2-6, α1-2, α1-3, α1-4, β-1-3, β1-4, β1-6, etc. In alternative embodiments, fractions of mucin glycans may be used, including without limitation the negatively charged fraction, the neutral fraction, and size fractions, e.g. short oligosaccharides of from about 2 to about 6 monosaccharide subunits in length, from about 4 to about 6 monosaccharide subunits in length; or a larger fraction, e.g. from about 6 to about 10 monosaccharide subunits in length, from about 6 to about 8 monosaccharide subunits in length, from about 8 to about 10 monosaccharide subunits in length, and the like. Glycans may also be fractioned based on composition, e.g. a fucosylated fraction, a non-fucosylated fraction, and the like.

The glycan composition may be treated by enzymatic or chemical methods to alter the composition, e.g. sialidase treat to eliminate sialic acids on glycans; fucosidase treatment; per-acetylatation; sulfation; and the like as known in the art.

Mucin glycans of the present invention may be released and isolated from the protein component of the mucin glycoprotein. Such isolated compositions may comprise less than 50% by weight protein, less than 25% by weight protein, less than 10% by weight protein, less than 5% by weight protein, or less.

Various methods are known and used in the art for the release of glycans from mucin glycoproteins. Such methods include enzymatic degradation, but more commonly a chemical release, which may be reducing or non-reducing. A conventional procedure of alkaline borohydride hydrolysis for release of O-linked oligosaccharides results in a reduced product, which requires a mild periodate oxidation step, e.g. using 0.1 N NaOH or KOH, 1 M $NaBH_4$ for 2-3 days at room temperature. After neutralization the glycan may be column-purified, and dried for further use. See also Manzi et al. (2000) Glycobiology 10:669-689; and Martens et al. (2008) Cell Host Microbe. 2008 4(5):447-57, both herein specifically incorporated by reference for methods known in the art of releasing glycans from glycoproteins.

Alternative methods for nonreductive release of O-linked oligosaccharides from mucin glycoproteins are described, for example, by Chai et al. (1997) Glycobiology 7:861-872, herein specifically incorporated by reference in its entirety. Such methods may utilize ethylamine, e.g. aqueous ethylamine at 70% w/v at 22 degrees C. for 48 h.

Figure 10:
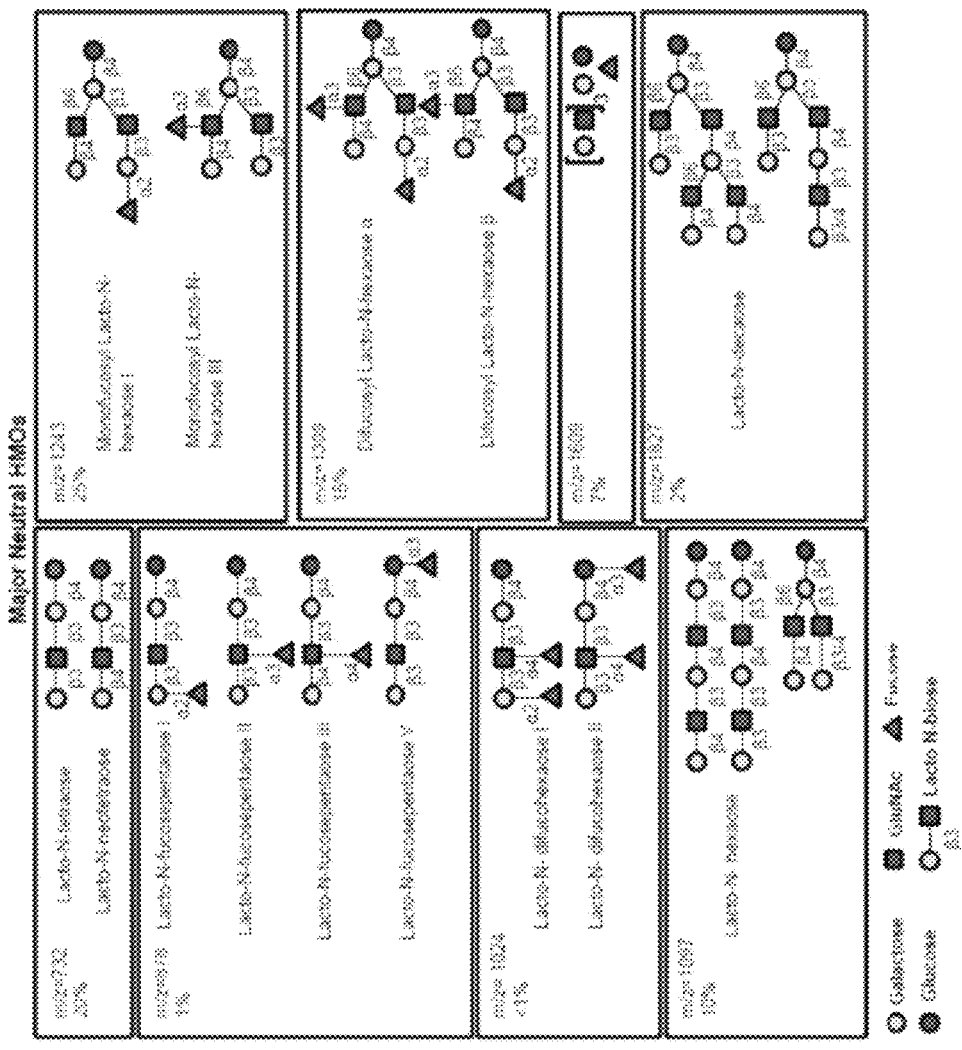
FIG. 10. Structures of most abundant neutral HMOs. m/z values are indicated as well as percent presence in the HMO pool.

Human milk oligosaccharides (HMO). HMO are composed of more than 200 structurally distinct linear and branched oligosaccharides that occur at high concentrations in human milk (~20 g/L in colostrum and ~5-12 g/L in mature milk). The synthesis of these compounds takes place in the mammary glands, and the wide diversity of structures include linear or branched lactosamine chains (Galβ1¾, GlcNAcβ1⅜) extended from a lactose (Galβ1-4Glc) core. Additional structural variability is due to the addition of the terminating sugars N-acetylneuraminic acid (Neu5Ac) in α2-3 or α2-6 linkages, and/or fucose in α1-2, α1-3 or α1-4 linkages. Within an individual, HMO diversity and concentration varies over the course of lactation and diurnally. A schematic of some of the major neutral HMO is shown in FIG. 10.

HMO are characterized by a lactose molecule at the reducing end to which subunits of lacto-N-biose (LNB; type 1 chain; Galβ1-3GlcNAc) or N-acetyl-lactosamine (type 2 chain; Galβ1-4GlcNAc) are attached in tandem. Fucose and sialic acid residues can be located at terminal positions. 200 different HMO structures have been determined, however, four molecular masses can represent up to the 70% of the total molecules, including isomers of lacto-N-tetraose (Galβ1-3GlcNAcβ1-3Galβ1-4Glc; LNT), lacto-N-neotetraose (Galβ1-4GlcNAcβ1-3Galβ1-4Glc; LNnT), lacto-n-hexaose (LNH), monofucosyl-lacto-N-hexaose and difucosyl lacto-N-hexaose.

Prebiotic compounds. As used herein the term "prebiotic" refers to nutritional supplements that are not digested by the mammal that ingests them, but which are a substrate for the growth or activity of the microbiota, particularly the gut microbiota. Many prebiotics are carbohydrates, e.g. polysaccharides and oligosaccharides, but the definition does not preclude non-carbohydrates. The most prevalent forms of prebiotics are nutritionally classed as soluble fiber. Prebiotics may provide for changes in the composition and/or activity of the gastrointestinal microbiota. See Gibson and Roberfroid *Dietary modulation of the human colonic microbiota: introducing the concept of prebiotics*. J. Nutr. 1995 June; 125(6): 1401-12, herein incorporated by reference. Prebiotics of interest for the present invention comprise an effective dose of mucin glycans.

Determination of whether a candidate mucin glycan or mucin glycan formulation will stimulate growth of a desired microorganism can be empirically determined. For example, a candidate may be tested for the ability to cause an upregulation of a PUL or a plurality of PULs, for example where the pattern of regulation is similar to that in response to HMO.

Microbiota. As used herein, the term microbiota refers to the set of microorganisms present within or upon an individual, usually an individual mammal and more usually a human individual. Of particular interest is the microbiota of the gut. While the microbiota may include pathogenic species, in general the term references those commensal organisms found in the absence of disease. The gut microbiota of adult humans is primarily composed of obligate anaerobic bacteria.

In a healthy animal, while the internal tissues, e.g. brain, muscle, etc., are normally presumed to be free of microorganisms, the surface tissues, i.e., skin and mucous membranes, are constantly in contact with environmental organisms and become readily colonized by various microbial species. The mixture of organisms known or presumed to be found in humans at any anatomical site is referred to as the "indigenous microbiota".

In humans, there are differences in the composition of the microbiota which are influenced by numerous factors including but not limited to age, diet, and the use of antibiotics. The microbiota of the large intestine (colon) is qualitatively similar to that found in feces. Populations of bacteria in the colon reach levels of $10^{11}$/ml feces. The intestinal microbiota of humans is dominated by species found within two bacterial phyla: members of the Bacteroidetes and Firmicutes make up >90% of the bacterial population. Actinobacteria (e.g., members of the *Bifidobacterium* genus) and Proteobacteria among several other phyla are less prominently represented. Significant numbers of anaerobic methanogens (up to $10^{10}$/gm) may reside in the colon of humans. Common species of interest include prominent or less abundant members of this community, and may comprise, without limitation, *Bacteroides thetaiotaomicron*; *Bacteroides caccae*; *Bacteroides fragilis*; *Bacteroides melaminogenicus*; *Bacteroides oralis*; *Bacteroides uniformis*; *Lactobacillus* sp.; *Clostridium perfringens*; *Clostridium septicum*; *Bifidobacterium bifidum*; *Enterococcus faecalis*; *Escherichia coli*; *Salmonella enteritidis*; *Klebsiella* sp.; *Enterobacter* sp.; *Proteus mirabilis*; *Pseudomonas aeruginosa*; *Peptostreptococcus* sp.; *Peptococcus* sp., *Faecalibacterium* sp.; *Roseburia* sp.; *Ruminococcus* sp.; *Dorea* sp.; *Alistipes* sp.; *Akkermansia* sp. etc.

The composition of the microbiota of the gastrointestinal tract varies longitudinally along the tract (along the cephalo-caudal axis) and transversely across the tract (with increasing distance from the mucosa). There is frequently a very close association between specific bacteria in the intestinal ecosystem and specific gut tissues or cells (evidence of tissue tropism and specific adherence). Gram-positive bacteria, such as the streptococci and lactobacilli, are thought to adhere to the gastrointestinal epithelium using polysaccharide capsules or cell wall teichoic acids to attach to specific receptors on the epithelial cells. Members of the segmented filamentous bacteria (SFBs) adhere to intestinal epithelium using a specialized structure on the cell surface known as a holdfast. Gram-negative bacteria such as the enterics may attach by means of specific fimbriae which bind to glycoproteins on the epithelial cell surface. Undoubtedly, other uncharacterized mechanisms of adherence exist and are relevant to microbiota attachment and localization within the gut.

The effect of the therapeutic formulation may be monitored by transcriptional profiling of the PUL usage of the microbiota, e.g. by testing a fecal sample from an individual following administration.

Detailed Description Of The Preferred Embodiments

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment.

Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Many species of the gut microbiota are well-adapted to use a multitude of dietary polysaccharides due to specialized machinery encoded by polysaccharide utilization loci (PULs), which appear to be specialized to the use of a particular class of carbohydrates. PULs are characterized by the presence of a pair of homologs to susC and susD (encoding proteins involved in starch importing and cell-surface binding, respectively). In addition, these loci can encode glycoside hydrolases, metabolic enzymes, and sensor/regulator systems and are highly regulated to allow optimal functional adaptation to different nutrient conditions within the gut. Transcriptional profiling of exemplary species growing in purified HMO and mass spectrometric analysis of HMO consumption has revealed *Bacteroides* employ the same PULs for mucin glycan and HMO consumption, suggesting that HMO have structural similarity to mucin glycans. In some embodiments of the invention mucin glycans and mucin glycan utilization may be screened or otherwise monitored by reference to PUL upregulation. In some embodiments of the invention, transcriptional upregulation of one or more PUL is monitored for screening purposes, for monitoring growth of desirable organisms, and the like. For example a suitable mucin glycan composition for use in the methods of the invention may be tested for its ability to upregulate PULs in a microorganism of interest, including without limitation *Bacteroides*, where at least one, at least two, at least three, at least four, at least five, at least seven up to at least ten or more PULs that are also selectively upregulated by the microorganism in response to HMO, as shown in the examples.

The present invention provides therapeutic formulations of mucin glycans, which may be isolated mucin glycans obtained from a non-human animal, generally provided in a unit dose that is effective in stimulating growth of desirable gut microorganisms. Such microorganisms may include, without limitation, species of *Bacteroides*. A typical dose of mucin glycans in a liquid format, for example as a prebiotic food supplement, may be from about 0.1 g/liter to not more than about 25 g/liter, for example at least 1 g/liter, 2.5 g/liter, 5 g/liter, 7.5 g/liter, 10 g/liter, 12.5 g/liter and unlikely to exceed about 20 g/liter, or 25 g/liter. When provided as a powder, the prebiotic may be in a unit dose of from about 0.1 g to 25 g, for example from about 0.5 g, about 1 g, about 2.5 g, about 5 g, about 7.5 g, about 10 g, or more. A dried form may be provided for reconstitution in water, or for ingestion in a pill, capsule, powder, etc.

The prebiotic mucin glycan supplement may be combined with food supplements, which include without limitation human milk oligosaccharides, including particularly HMO having a structure distinct from mucin glycans. In some embodiments the mucin glycan prebiotic comprises lacto-N-neotetraose (LNnT) or lacto-N-tetraose (LNT). A typical ratio of LNnT or LNT to the mucin glycans is from about 20:1, 10:1, 5:1, 1:1, 1:5, 1:10, 1:20, 1:50, usually from about 1:1 to about 1:20.

A prebiotic supplement may be provided in a liquid or dried form, or added to foods such as, for example, solid baby food, fruit juices, gelatin, cookies, candies, bread, bars, etc. One of skill in the art will appreciate that a large variety of foodstuffs can accommodate the addition of a prebiotic supplement. The form of administration of and incorporation of mucin glycans in the method of the present invention is not critical, as long as an effective amount is administered. Other examples of administering mucin glycans in nutrients can be developed by a person with ordinary skill in the art of nutrition. All these forms of mucin glycans administration, as well as others, are within the scope of the present invention.

The mucin glycans are incorporated into a variety of formulations for therapeutic administration. In one aspect, the agents are formulated into pharmaceutical compositions by combination with appropriate, pharmaceutically acceptable carriers or diluents, and are formulated into preparations in solid, semi-solid, liquid or gaseous forms, such as tablets, capsules, powders, granules, ointments, solutions, gels, microspheres, etc. As such, administration of the mucin glycan can be achieved in various ways, usually by oral administration.

For oral preparations, the agents can be used alone or in combination with appropriate additives to make tablets, powders, granules or capsules, for example, with conventional additives, such as lactose, mannitol, corn starch or potato starch; with binders, such as crystalline cellulose, cellulose derivatives, acacia, corn starch or gelatins; with disintegrators, such as corn starch, potato starch or sodium carboxymethylcellulose; with lubricants, such as talc or magnesium stearate; and if desired, with diluents, buffering agents, moistening agents, preservatives and flavoring agents.

Formulations are typically provided in a unit dosage form, where the term "unit dosage form," refers to physically discrete units suitable as unitary dosages for human subjects, each unit containing a predetermined quantity of mucin glycan in an amount calculated sufficient to produce the desired effect in association with a pharmaceutically acceptable diluent, carrier or vehicle. The specifications for the unit dosage forms of the present invention depend on the particular complex employed and the effect to be achieved, and the pharmacodynamics associated with each complex in the host.

The pharmaceutically acceptable excipients, such as vehicles, adjuvants, carriers or diluents, are commercially available. Moreover, pharmaceutically acceptable auxiliary substances, such as pH adjusting and buffering agents, tonicity adjusting agents, stabilizers, wetting agents and the like, are commercially available. In some embodiments the mucin glycans are provided as a supplement to, or in a format of an infant formulation, where the mucin glycans are provided in amounts that mimic the concentration of oligosaccharides found in human breast milk. The present invention additionally provides a method of making such formulations, in the form of milk protein-based formulas, both with and without lactose, non-milk-based formulas, including soy protein-based formulas, amino acid formulas, and rice protein formulas. In some embodiments the formula comprises LNnT or LNT in addition to the mucin glycans.

A convenient form of administration for infant formulas is to add mucin glycans to an infant formula (Including those for both term and preterm infants), follow-on formula, toddler's beverage, milk, yogurt, or fermented product. Alternatively, mucin glycans can be administered as a supplement that is not part of a formula feeding such as, for example, drops, sachets or combinations with other nutrients such as vitamins.

In one embodiment of the invention, mucin glycans is administered as part of an infant formula. The infant formula for use in the present invention is, typically, nutritionally complete and contains suitable types and amounts of lipids, carbohydrates, proteins, vitamins and minerals. The amount of lipids or fats typically can vary from about 3 to about 7 g/100 kcal. The amount of proteins typically can vary from about 1 to about 5 g/100 kcal. The amount of carbohydrates and mucin glycans typically can vary from about 2 to about 20 g/100 kcal, e.g. from about 6 to about 15 g/kcal. Protein sources can be any used in the art, and may include, for example, nonfat milk, whey protein, casein, soy protein, hydrolyzed protein, and amino acids. Lipid sources can be any used in the art such as, for example, vegetable oils such as palm oil, soybean oil, palm olein oil, corn oil, canola oil, coconut oil, medium chain triglyceride oils, high oleic sunflower oil, and high oleic safflower oil. Carbohydrate sources can be any known in the art such as, for example, lactose, glucose polymers, corn syrup solids, maltodextrins, sucrose, starch, and rice syrup solids.

Conveniently, several commercially available infant formulas can be used as the basic formula for the mucin glycan additions. For example, Enfamil™ Lipil with iron (available from Mead Johnson & Company, Evansville, Ind., U.S.A.) may be supplemented with an effective amount of mucin glycans and used to practice the method of the present invention.

The total protein in the formulation from all protein sources should be nutritionally appropriate for infants, which is typically from about 12 g per liter to 18 g per liter and, in some embodiments, may be about 14 g per liter. The total mucin glycans in the formulation may be between about 100 and about 25000 mg per liter and, in one embodiment, between about 500 and about 2500 mg per liter.

The remainder of the components of the formula, including fats, carbohydrates, vitamins, and minerals, should be nutritionally appropriate for infants, as found for example in various commercial formulas such as Enfamil with LIPIL, Similac with Iron, or Similac Advance.

The infant formula supplemented with mucin glycans for use in the present invention can be made using standard techniques known in the art. For example, mucin glycans can be added to the formula by replacing an equivalent amount of other carbohydrates.

The following examples describe exemplary embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples all percentages are given on a weight basis unless otherwise indicated.

EXAMPLE 1

Milk Oligosaccharides Are Consumed by *Bacteroides* Via Mucus-Utilization Pathways The human gut is rapidly colonized by a vast array of microbes after birth and a seemingly chaotic assembly process proceeds over the first years of life to form a complex microbial ecosystem. The factors that govern which microbial lineages are maintained within a developing intestinal microbial ecosystem remain poorly defined. Oligosaccharides present in human milk are consumed by the nursing infant and pass undigested to the distal gut where they may be consumed by microbes. Here we investigate the consumption of human milk oligosaccharides (HMO) by *Bacteroides*, a dominant genus within the intestinal microbiota of Westerners. HMO induce an expansive transcriptional response in *Bacteroides thetaiotaomicron*, a prominent gut resident, that includes 13 polysaccharide utilization loci and 46 glycoside hydrolases. Genetic ablation of locus functionality, singly or in combination, reveals degeneracy within the response. We demonstrate that polysaccharide utilization loci up regulated during growth in HMO are poorly conserved between Bacteroides species, but are the same loci mobilized when these species consume host mucus glycans—glycans that share a striking degree of structural similarity to HMO. The uniform depletion of short and long-chain HMO by *B. thetaiotaomicron* contrasts to the short-chain preference of the HMO-adapted *Bifidobacterium longum* subsp. *infantis*, a strain that is unable to use host-mucin glycans. A discrete strategy for HMO utilization is evident in *Bacteroides fragilis*, which up regulates loci not present in *B. thetaiotaomicron*, including those involved in the use of sialic acid, a terminal sugar of host glycans. Together, these results suggest HMO mimicry of mucus glycans represents a strategy of mothers to attract mutualistic mucus-adapted *Bacteroides* species to the infant intestine. Many *Bacteroides* species are adept at using both mucus and dietary plant glycans and the presence of this genus in the infant may ease microbiota transition to plant-rich solid food.

The infant gut undergoes a complex and unpredictable process of colonization during the first months of life, characterized by extreme fluctuations in overall density and membership. This apparently chaotic establishment of microbes contrasts with the relative stability of the microbiota that is achieved in adulthood. Multiple variables appear to be relevant in shaping the microbial composition of the newborn such as delivery mode (caesarean section vs natural delivery), antibiotic treatment, environment and feeding patterns. However, we know very little about the mechanisms that connect these factors to microbiota assembly.

Several studies indicate that breast-milk versus formula feeding can play a large role in infant intestinal microbiota composition. Breast-fed infant intestines are often enriched for *bifidobacteria*. The ability of certain *Bifidobacterium* species to consume human milk oligosaccharides (HMO), a class of carbohydrates within human milk, suggests that HMO may promote intestinal colonization of specific subsets of microbes.

*Bacteroides* species are variably abundant in the infant gastrointestinal microbiota, but by the first year of life they are consistently present in the gut, and become one of the predominant genera within the microbiota of healthy western adults. These species are well-adapted to use a multitude of both dietary polysaccharides and host-derived glycans (e.g., mucus) due to specialized machinery encoded by polysaccharide utilization loci (PULs). PULs have been widely expanded within the genomes of *Bacteroides* and each appears to be specialized to the use of a particular class of carbohydrates. For example, one prototypic and widely studied human-derived *Bacteroides* spp. *B. thetaiotaomicron* (Bt) possesses 88 such loci. PULs are characterized by the presence of a pair of homologs to susC and susD (encoding proteins involved in starch importing and cell-surface binding, respectively). In addition, these loci can encode glycoside hydrolases, metabolic enzymes, and sensor/regulator systems and are highly regulated to allow optimal functional adaptation to different nutrient conditions within the gut.

The ability of *Bacteroides* to utilize HMO suggested that specific PULs within these *Bacteroides* genomes are involved in HMO use. We have pursued the mechanisms that underlie HMO consumption by *Bacteroides*. Transcriptional profiling two *Bacteroides* species growing in purified HMO and mass spectrometric analysis of HMO consumption has revealed *Bacteroides* employ the same PULs for mucin glycan and HMO consumption. Using Bt as a model microorganism, we have demonstrated a functional degeneracy in the machinery involved in the metabolism of host mucin glycans and HMO. In addition, we have verified the absence of conservation in HMO-utilization genes between members of different HMO-using *Bacteroides* species, which suggests that HMO use is either a convergent functionality within the genus or relies upon pathways that have been differentially shaped by other selective forces, such as mucus utilization. Our results suggest that HMO have structural similarity to mucin glycans, which enables milk oligosaccharides to play a dual role in selecting for species that are HMO-adapted or selecting for species that are mucus adapted.

Results

Bt up regulates multiple polysaccharide utilization loci during consumption of HMO in vitro. We grew Bt in minimal medium (MM) containing HMO (1.5% w/v) as the sole carbohydrate to investigate if this strain consumes human milk glycans in vitro. Bt exhibits a biphasic growth curve and plateaus in stationary phase after 24 h (FIG. 1A, top panel). Next, we defined the transcriptional response of Bt during HMO consumption using whole genome transcriptional profiling with a custom Bt VPI-5482 GeneChip that represent >98% of this organism's protein coding genes. The transcriptome was analyzed near the midpoints of the two logarithmic growth phases in MM-HMO (n=2 biological replicates/growth phase, four datasets total). As a baseline for comparison, we used previously reported in vitro datasets of Bt grown in MM-glucose. A total of 156 genes are significantly up regulated during the first phase, and 230 genes during the second phase, when compared to MM-glucose (see Materials and Methods section). Within these combined 253 genes (132 were commonly up regulated in both phases), 137 genes had ≥5-fold change in expression when compared to MM-glucose (see Table S1 for complete list of genes).

Figure 8:
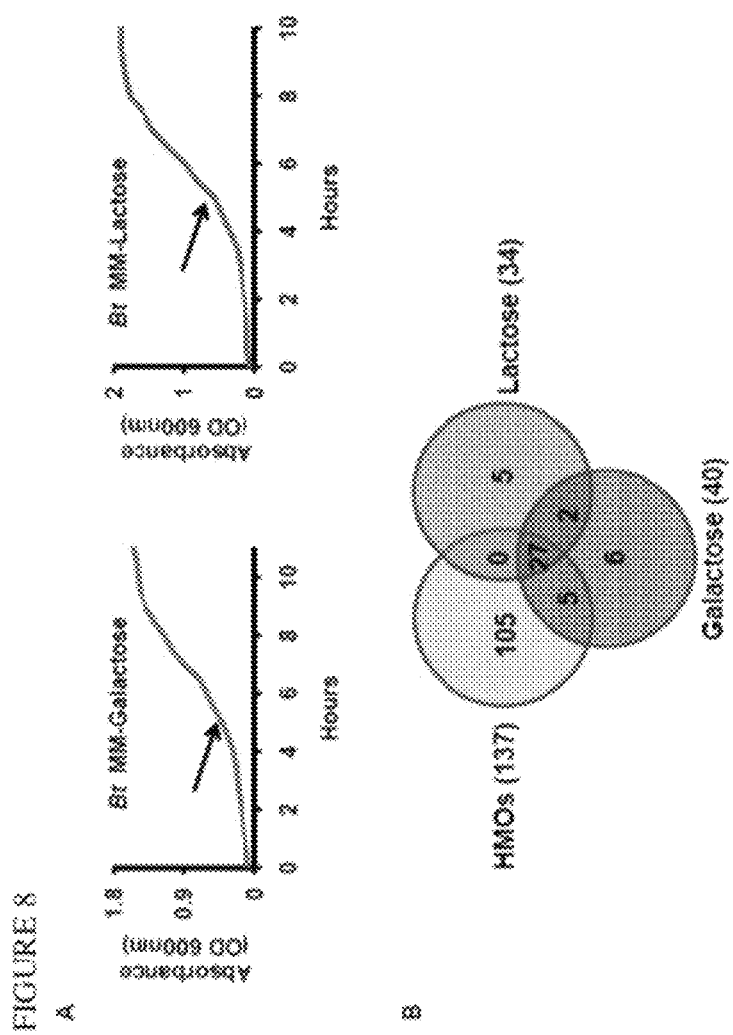
FIG. 8. Bt response to different sugars A) Growth curves of Bt in MM-galactose and MM-lactose. Black arrows indicate sampling timepoints B) Genes from Bt that exhibit ≥5 fold induction in MM-HMO, MM-lactose and MM-galactose, relative to growth in MM-glucose. Up regulated genes from both in vitro growth phases in MM-HMOs were combined into one group to generate the venn diagram.
Figure 9:
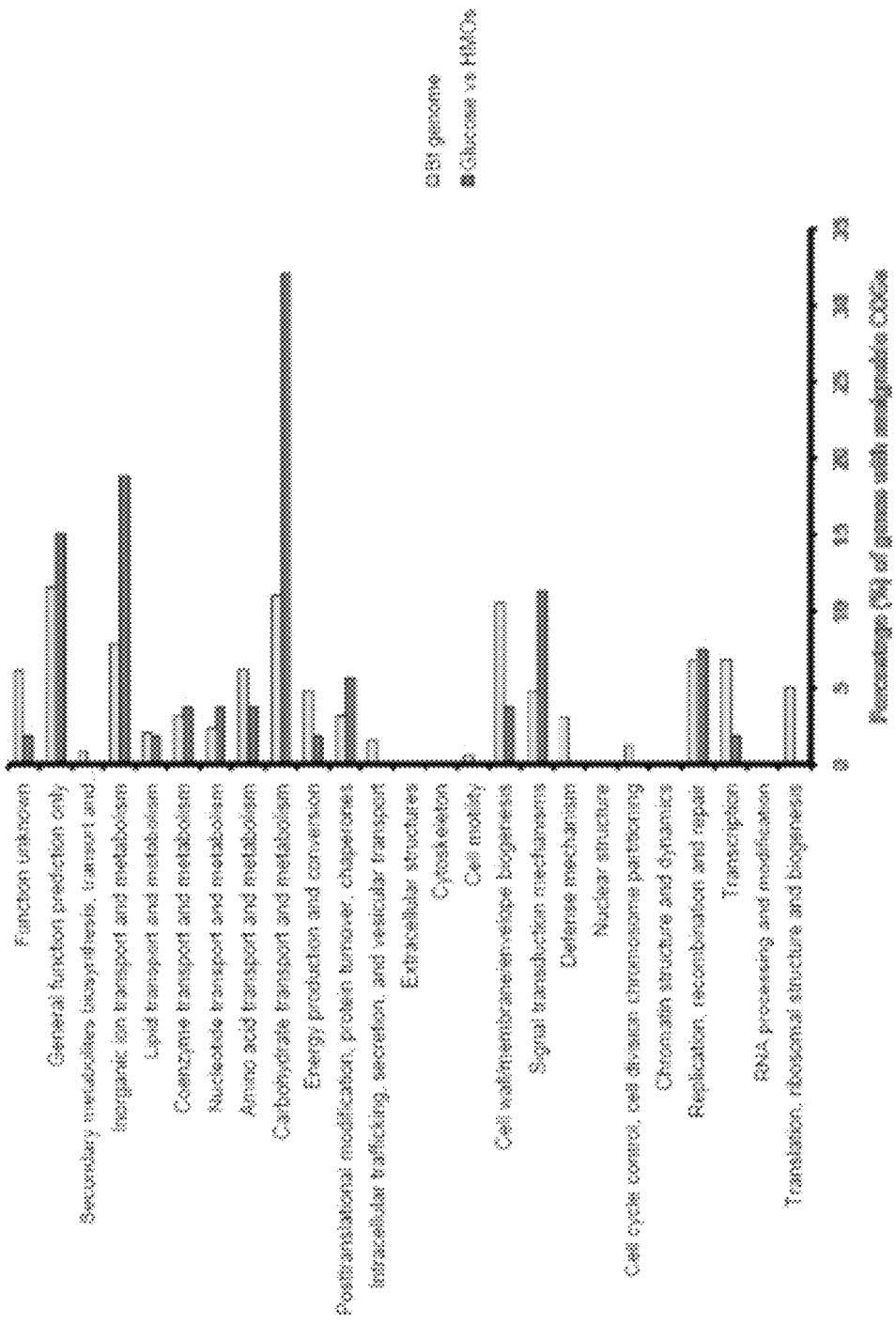
FIG. 9. COG categorization of Bt genes with a significant increased expression in MM-HMOs. Two groups of genes with assignable COGs are considered: 60 of 105 genes up regulated in MM-HMOs (blue), and 3372 of 4723 genes within the Bt genome that were categorized by NCBI (yellow). Bars represent the percentage of genes that fall within a given COG. The largest group of genes up regulated in MM-HMOs belongs to the "carbohydrate transport and metabolism" COG.

We wished to identify which portion of the observed Bt transcriptional response in MM-HMO was due to the complex oligosaccharides versus simple core sugars, lactose and galactose. Therefore, we performed transcriptional profiling of Bt grown in MM-galactose and MM-lactose (n=2 mid-log phase datasets for each of these monophasic growths; see FIG. 8 for growth curves and sampling timepoints). Comparison of these datasets with the baseline MM-glucose revealed many fewer genes respond to the simple carbohydrates: 40 Bt genes are significantly up regulated at least 5-fold in MM-galactose and 34 genes are up regulated in MM-lactose. Thirty-two of the 137 genes up regulated at least 5-fold in the MM-HMO response were also up regulated in the presence of galactose and/or lactose, consistent with the presence of these simple sugars in the core structures of all HMO (See FIG. 8B). The 105 genes that were specifically up regulated in either phase of HMO growth (i.e., not up regulated in MM-galactose or MM-lactose) were highly enriched in genes represented in the COG functional group "Carbohydrate metabolism and transport" (32.1% compared with 11% representation across the genome) (FIG. 9). These data suggest that this 105-gene signature captures the Bt response to the structural complexity within HMO.

Eighty of the 105 genes within the HMO-specific response are found within 10 PULs, consistent with oligosaccharide acquisition and degradation. Two of these PULs encode putative fucosidases, key enzymes in removing fucose residues present on HMO. The response also includes 3 endo-β-N-acetylglucosaminidases, whose activity aids in the breakdown of oligo- and polysaccharides. The larger 253 gene group that is upregulated in both phases of HMO growth included several additional susC and susD-like genes. We therefore assigned the entire HMO transcriptional response to 13 specific PULs or partial PULs up regulated in one or both phases of HMO growth (FIG. 1A, bottom panel). Our results show that three PULs or partial PULs were highly up regulated during the first phase (BT2828-BT2825, BT3854-

BT3862, BT3958-BT3965), seven during the second phase (BT1036-BT1051, BT1280-BT1285, BT1624-BT1632, BT3172-BT3173, BT4038-BT4040, BT4132-BT4136, BT4294-BT4299) and three (BT0459-BT0461, BT2615-BT2633, BT3773-BT3792) at both time points. Average fold changes for genes within each polysaccharide utilization locus (PUL) or partial PUL ranged from 8- to 173-fold. Five different classes of regulators are represented within these 13 PULs including seven hybrid-two-component systems, two extracytoplasmic function sigma (ECF-σ) factor/anti-σ factor pairs, one "two component system response regulator/sensor histidine kinase" pair, one SARP family transcriptional regulator, and one transcriptional regulator from the CRP family. One PUL lacked a physically associated regulator (BT0459-BT0461).

The biphasic growth curve shown by Bt in MM-HMO suggests a sequential, preferential degradation of the glycans. We used laser desorption/ionization coupled with mass spectrometry to characterize the consumption of 16 structurally defined neutral milk oligosaccharides, which represents >85% of the total HMO pool. After the completion of the first or second exponential phases, culture supernatants were filtered, and remaining HMO were purified, reduced and profiled by HiRes matrix-assisted laser desorption/ionization-Fourier transform ion cyclotron resonance mass spectrometry (MALDI-FTICR-MS). During the first phase of growth, Bt consumes the full spectrum of HMO, and does not exhibit large differences in the selectivity based on degree of polymerization (DP), although a slight preference for larger oligosaccharides is apparent (FIG. 1B). After the second exponential phase all the glycans were depleted >80%, with the single exception being the smallest oligosaccharide mass with a m/z 732.25. This mass corresponds to two isomers present in a high concentration in the HMO pool: lacto-N-tetraose (LNT, Galβ1-4GlcNAcβ1-3Gal) and lacto-N-neotetraose (LNnT, Galβ1-3GlcNAcβ1-3Gal) (see FIG. 10 for major HMO structures). Bt exhibits no preference for fucosylated or non fucosylated glycans. These results confirm that the expansive and flexible saccharolytic capacity of Bt previously described for use of mucus glycans and plant polysaccharides extends to the efficient utilization of a broad range of HMO.

Figure 2:
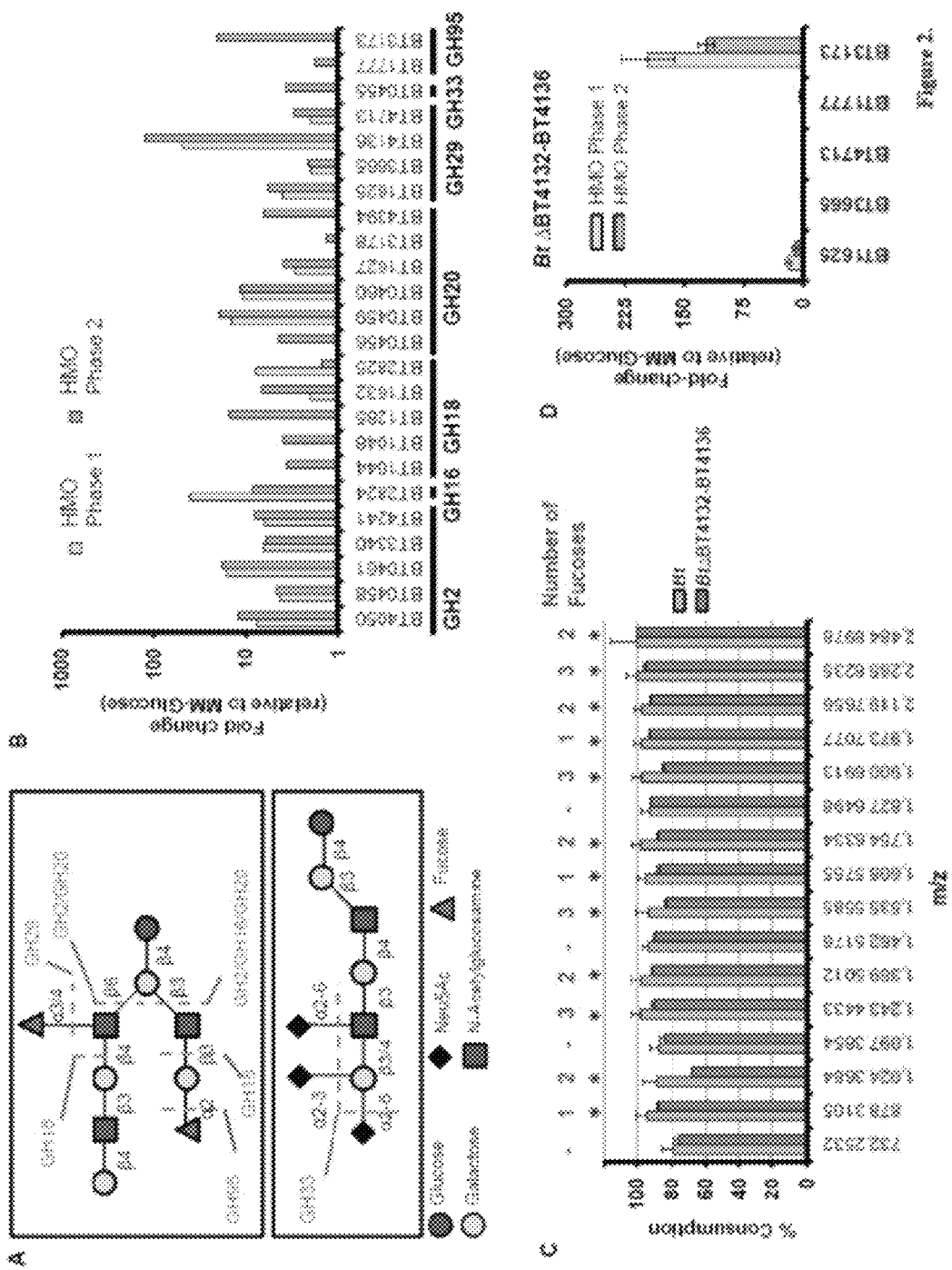
FIG. 2. Regulation of Bt glycoside hydrolases in the presence of HMO. A) Schematic of basic linkages in branched (top box) and linear (bottom box) HMO structures and putative glycoside hydrolase families (GH) involved in HMO degradation B) Induction in expression during growth in MM-HMO relative to MM-glucose for the 24 GHs that could hydrolyze the linkages found within milk glycans shown in panel A. Locus tags are shown on X-axis with family designation written below. C) HMO consumption profiles of Bt and BtΔBT4132-BT4136 at the beginning of the stationary phase after growth in MM-HMO, determined using MALDI-FTICR-MS. D) Fold-induction of fucosidase genes in the mutant strain BtΔBT4132-BT4136 during growth in MM-HMO compared to MM-glucose as measured by qRT-PCR. Standard errors of expression levels from three biological replicates are shown.

Bt HMO use is characterized by extensive and malleable glycoside hydrolase expression. Degradation of milk oligosaccharides requires numerous glycoside hydrolase activities to break the variety of linkages found in their structures. In addition to the structural complexity within any specific oligosaccharide, concentration and diversity of the different oligosaccharides in milk is influenced by mother-to-mother variability and time of lactation. Bt possesses a repertoire of degradation machinery capable of accommodating structural diversity in milk oligosaccharides. Bt is equipped with >260 glycoside hydrolases, including several with the predicted activities required to process HMO. Transcriptional profiles revealed that during growth in MM-HMO Bt up regulates an extensive range of glycoside hydrolases associated with SusC/SusD-like binding and importing systems. Forty-six of the 253 HMO-induced genes encode predicted glycoside hydrolases that are classified into 18 glycoside hydrolase families (GH) according to the Carbohydrate Active Enzyme database (CAZy) [30] (Table S2). FIG. 2A shows a schematic of branched and linear HMO structures as well as seven GH families that represent 24 of the 46 GHs in Bt's response that target the most common linkages found within milk glycans. Additional glycoside hydrolases not predicted to degrade the most common HMO linkages were also up regulated including members of the GH76 and GH92 families. It is possible that these genes are responding to N-linked glycans, which are present in milk at low levels.

The abundance of fucosylated oligosaccharides in HMO suggests that fucosidases are important both in accessing these terminating monosaccharides and also unmasking the hexoses and hexosamines within the glycan backbone. The HMO-utilizing *Bifidobacterium longum* subsp. *infantis* (*Bif. infantis*) encodes four fucosidases, consistent with the importance of these enzymes in HMO use. Bt up regulates four α-fucosidases belonging to GH29 family (BT1625, BT3665, BT4136, BT4713) and two α-fucosidases of the GH95 family (BT1777, BT3173) during growth in MM-HMO (FIG. 2B).

Figure 11:
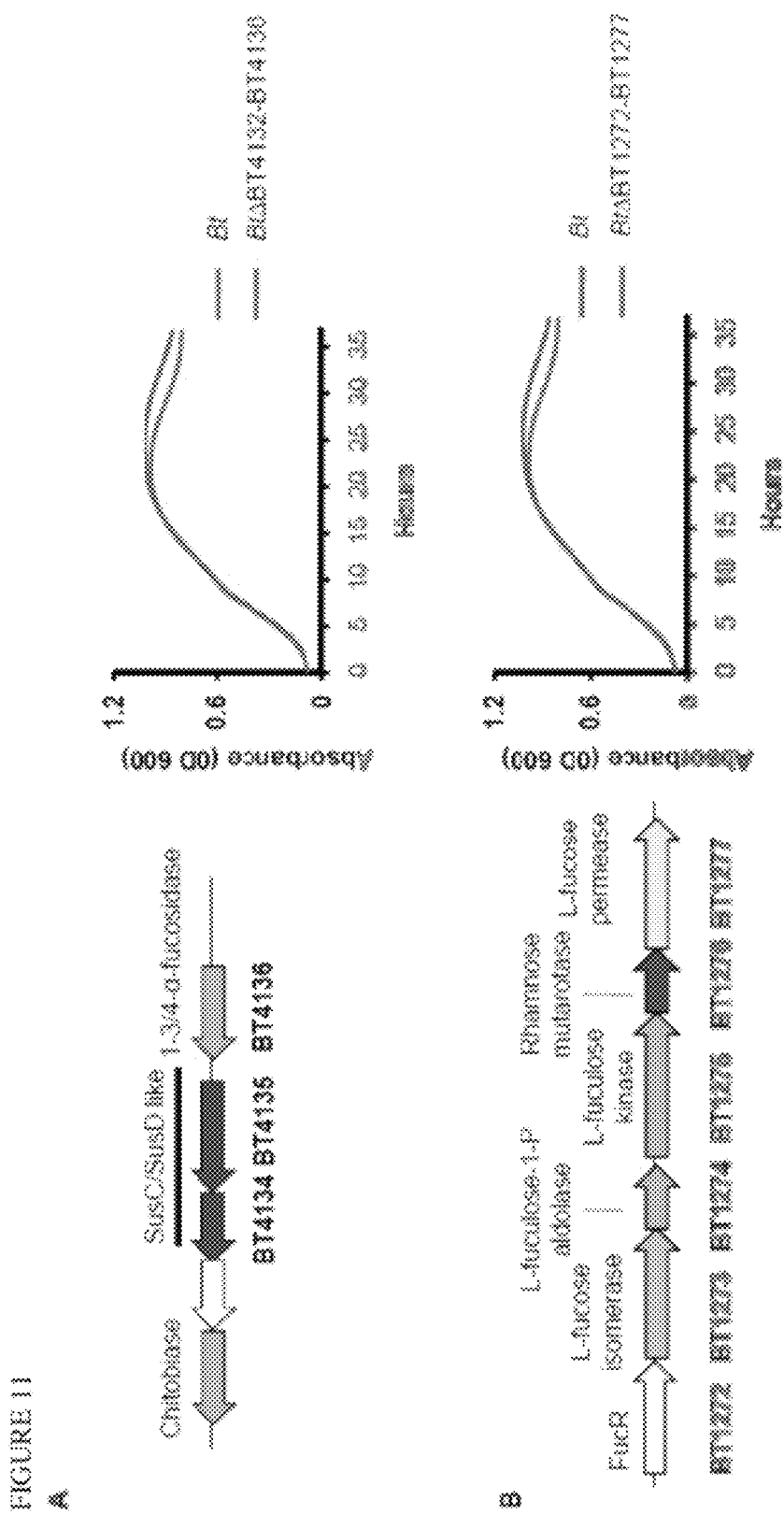
FIG. 11. Growth of mutant Bt strains in MM-HMO. A) Genomic organization of BT4132-BT4136 locus and growth curves of Bt and BtΔBT4132-BT4136 in MM-HMOs B) Genomic organization of BT1272-BT1277 locus (fucose catabolism locus) and growth curves of Bt and BtΔBT1272-BT1277.

The fucosidase, BT4136, is the most up-regulated of all 46 HMO-responsive glycoside hydrolases in the Bt genome (51.2-fold and 124.0 fold induction during the first and second growth phase, respectively). The entire PUL containing BT4136 (BT4132-BT4136), presented a high level of up regulation (range 20- to 58-fold in HMO phase 1, and 76- to 189-fold in HMO phase 2, across five genes). In addition to the fucosidase-encoding gene, this PUL includes genes encoding a SusC/SusD-like pair (BT4134 and BT4135), and a putative chitobiase (BT4132) (FIG. 11A). We generated a deletion of all genes contained within the PUL to determine the effect of the loss of this locus in HMO consumption. Growth of Bt lacking BT4132-BT4136 (BtΔBT4132-BT4136) in MM-HMO was unchanged when compared to wt Bt, demonstrating that this highly expressed PUL is not required for efficient growth in HMO in vitro (FIG. 11A).

We were curious whether loss of the highly expressed fucosidase-encoding PUL altered fucosylated HMO consumption. Glycoprofile analysis of HMO consumption by BtΔBT4132-BT4136 was performed at the end of the exponential phase, and results were compared with those obtained for wt Bt at the end of the growth (FIG. 2C). This analysis shows that the absence of the PUL (BT4132-BT4136), which contains the fucosidase BT4136, modified the glycan consumption profile, with significant decrease in the consumption of fucosylated glycans (m/z 878.31, 1024.36, 1243.44, 1389.50, 1535.55, 1608.57, 1754.63, 1900.69, 1973.70, 2119.76, 2265.82 and 2484.89). The percent consumption of all four non-fucosylated HMO was not affected in the mutant strain.

Since the deletion of a HMO-responsive fucosidase-containing PUL does not influence Bt's ability to grow using HMO in vitro and has significant but small impact on depletion of fucosylated oligosaccharides, we wondered whether expression of other fucosidases could be compensating for the absence of BT4136. Therefore we surveyed expression of the remaining HMO-responsive fucosidases. RNA was extracted at mid-log phase of BtΔBT4132-BT4136 growing in MM-HMO or MM-glucose and the expression of the remaining five HMO-induced fucosyl hydrolase genes (BT1626, BT3665, BT4713, BT1777 and BT3173) was evaluated by qRT-PCR, using three biological replicates. Results revealed an alteration in the response of BtΔBT4132-BT4136 to HMO use, with a significant increase in the expression of the α-fucosidase gene BT3173 (up regulated 197-fold in HMO phase 1 and 124-fold in HMO phase 2 for the mutant compared to wt exhibiting no induction in phase 1 and only 21-fold induction in phase 2; as shown in FIG. 2B) (FIG. 2D). Together, these results are consistent with the robust HMO response mounted by Bt, which appears to be malleable and possesses compensatory means of accessing diverse substrates.

Bt HMO use is coupled to up regulation of mucin glycan degradation pathways. Substrate specificities of several Bt PULs have been inferred or defined using growth conditions in which Bt is reliant upon host derived gut mucus glycans. We wished to determine if a subset of Bt's HMO-induced response was shared with those obtained from Bt grown in host-derived mucin carbohydrates. We compared our in vitro Bt HMO growth expression data with data previously reported for Bt in three different experimental paradigms in which Bt is reliant upon host mucus glycans: (i) grown in purified porcine mucus glycans (PMG) (n=3 replicates/ growth phase, 2 time points, corresponding to two exponential phases from a biphasic growth); (ii) colonizing 17-day-old gnotobiotic suckling mice (n=6 replicates) [33]; and (iii) colonizing adult mice that were fed a diet that lacks complex glycans ("simple sugar diet", n=3 replicates). Transcriptional profiling datasets obtained from these in vivo conditions were analyzed using Bt grown in MM-glucose in vitro as a baseline (See Table S3).

Figure 3:
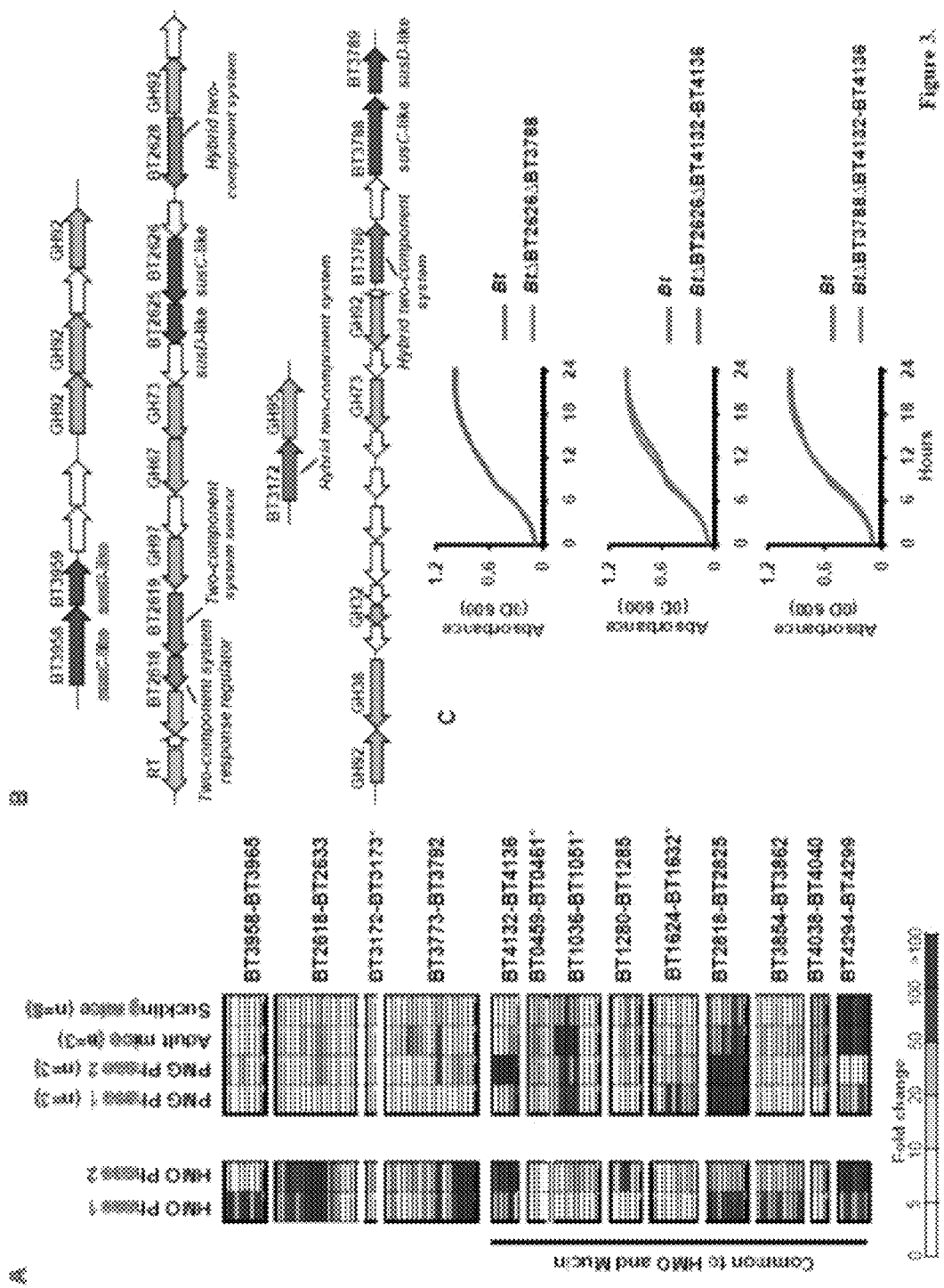
FIG. 3. Multiple deletions of HMO-induced PUL genes do not affect growth of Bt in HMO in vitro. A) Heat map showing fold induction relative to growth in MM-glucose of Bt HMO-induced PULs or partial PULs (*) during growth in HMO, porcine mucin glycans (PMG), or host intestinal glycans in adult or suckling mice. B) Genomic organization of the four HMO specific up regulated PULs. Genes encoding SusC- or SusD-like proteins (red), glycoside hydrolases (green) and signaling systems (blue) are highlighted. C) Growth curves of the Bt mutants, BtΔBT2626ΔBT4132-BT4136, BtΔBT2626ΔBT3788 and Bt ΔBT3788ΔBT4132-BT4136 compared to wild-type Bt in MM-HMO.

Nine of the 13 PULs or partial PULs up regulated by Bt during growth in MM-HMO were also highly upregulated (≥10 fold-induction) in all or some of the datasets of Bt growing in mucin glycans (FIG. 3A). This overlap between HMO- and mucin-induced genes presents the possibility that Bt responds to structural motifs that are common to oligosaccharides found in mother's milk and intestinal mucin glycans. For instance, in all datasets we observed increased expression of the PUL BT2818-BT2826, which encodes glycoside hydrolases predicted to cleave the linkages from the structure Galβ1-4GlcNAcβ1-3Gal, a structure common to HMO and mucins. Alternatively, four Bt PULs exhibit increased expression specific to HMO: three complete PULs (BT2618-BT2633, BT3172-BT3173 and BT3958-BT3965) and one partial PUL (BT3172-BT3173) (FIG. 3B). These data indicate that Bt responds to aspects of the milk-derived glycans that are not found appreciably in PMG or mouse mucin.

We tested if these HMO-specific PULs are required for HMO consumption by creating Bt mutants in three of the "HMO-specific" loci. In-frame deletions for the respective susC-like porin-encoding genes were constructed due to the typical requirement of these proteins for efficient growth in the respective carbohydrate. The resulting deletion strains (BtΔBT2626, BtΔBT3788, and BtΔBT3958) showed no defect in growth in HMO in vitro. Furthermore, a double deletion strain that combined mutations in the two PULs exhibiting the highest expression across both phases of growth in HMO (BtΔBT2626ΔBT3788) also showed no growth defect in HMO growth. We constructed two additional strains that combined each of these two susC mutants with the fucosidase PUL deletion (BtΔBT2626ΔBT4132-BT4136, BtΔBT3788ΔBT4132-BT4136), which also failed to show defects in HMO growth (FIG. 3C). Together, these results indicate that Bt's response to HMO includes extensive upregulation of PULs that are also responsive to the structurally similar mucin glycans. Extensive degeneracy exists within this response, even within the subset of genes that is specifically responsive to HMO. Such degeneracy in use of the structurally heterogenous HMO contrasts to the strict requirement of genes within the fructan-use locus for fructan consumption by Bt.

The expression data reveal that in addition to several PULs, the fucose catabolism locus (BT1272-BT1277) is up regulated in both milk and mucin glycans, consistent with fucose use by Bt when fucosylated glycans are present [34]. We constructed a Bt mutant that lacks this fucose catabolism locus to ascertain its contribution to Bt's growth in HMO. The resulting mutant strain BtΔBT1272-BT1277 is unable to grow in MM-fucose, but showed no growth defect in MM-HMO (FIG. 11B). We also tested the mutant's growth in MM containing purified mucin glycans that contain fucosylated glycans (MM-PMG) and we again observed no change in the phenotype of the strain compared to the wild type. These data suggest that fucose is of marginal importance as a carbon and energy source when Bt is growing the presence of a complex mix of HMO or mucin glycans in vitro.

HMO utilization genes are not conserved among Bt strains. The dispensability of the HMO-induced PULs suggests that compensatory mechanisms for HMO use are encoded within Bt's response, but could also be a result of our assessment of functionality using in vitro growth. If loss of these loci results in a disadvantage in vivo, we would expect them to be conserved in other Bt strains. However lack of conservation of the HMO-induced PULs between Bt strains would be consistent with relative dispensability of these loci. Based on the transcriptional profiling data, 13 PULs or partial PULs are implicated in the degradation and consumption of HMO in the genome of Bt. Using comparative genomics between the type strain of Bt and two additional strains (VPI-3731, VPI-7330) for which draft genome data are available we assessed the conservation of genes within the HMO-induced PULs. All three strains grow very similarly in HMO with very similar doubling times (5482=3.31 h; 3731=4.58 h, 7330=3.73 h) and maximal densities (OD600; 5482=1.08, 3731=1.08, 7330=1.15) (FIG. 4A).

Figure 4:
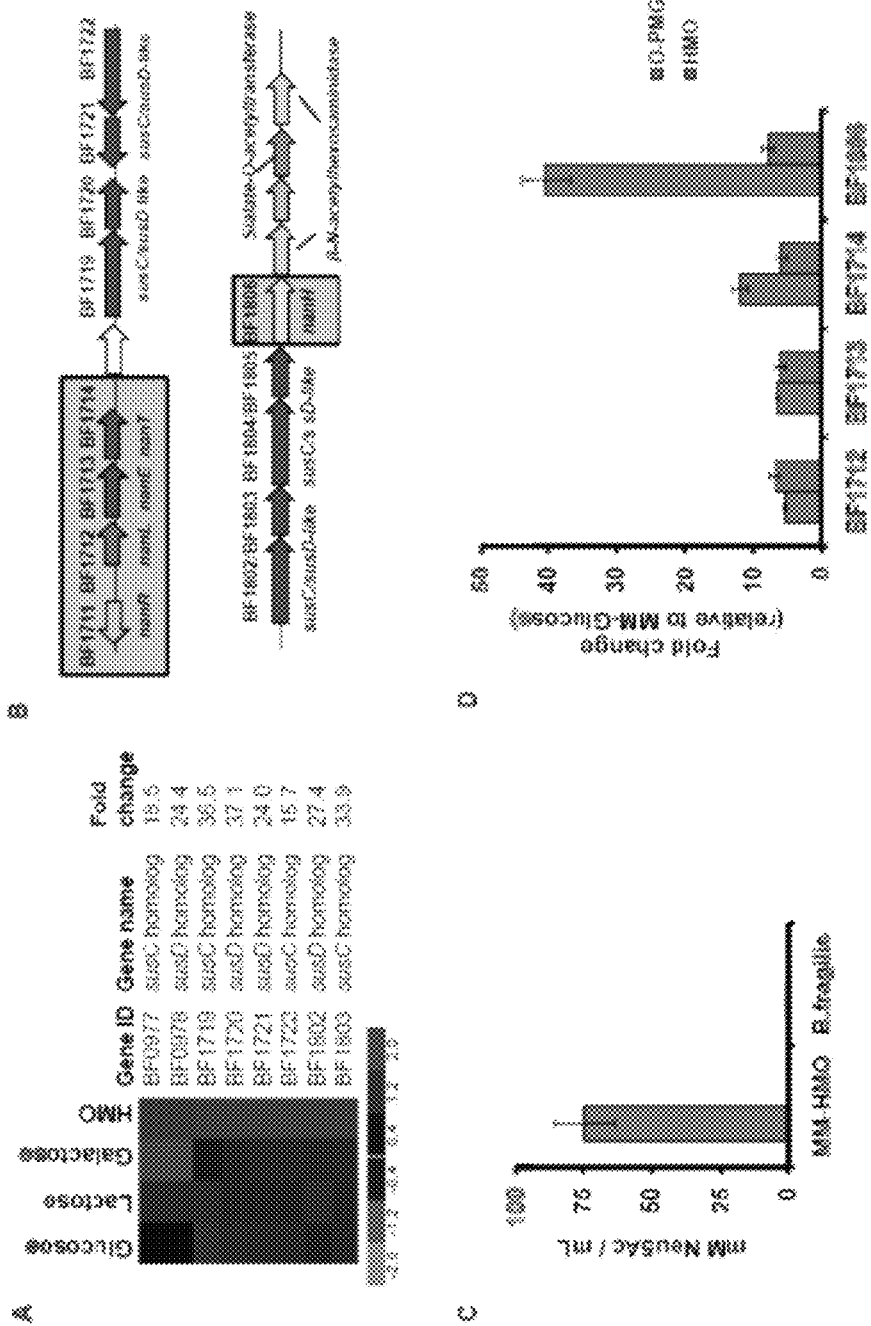
FIG. 4. Bt strains show minimal conservation in HMO-related PUL genes. A) Growth curves of the type strain of Bt VPI-5482 and two additional Bt strains in MM-HMO. B) Percent identity of Bt VPI-5482 HMO-related PUL genes compared to genes of two strains of Bt (Bt VPI-3771 and Bt VPI-7330) C) The presence of HMO-related PUL genes in each Bt strain as determined by genomic hybridization to the Bt VPI-5482 GeneChip. Percent of genes conserved within each locus are indicated in different blue tones.

We found, using BLASTP, that some of the HMO-induced PULs in the Bt type strain were completely or partially absent in the respective genome of VPI-3731 and VPI-7330 (FIG. 4B). For instance, Bt VPI-3731 lacked genes belonging to the loci BT2628-BT2633 and BT3773-BT3792, as well as all genes within the PUL BT4132-BT4136. The same results were found in the genome of Bt VPI-7330, which also lack two additional genes, BT3172-BT3173. To rule out the possibility that the missing HMO-related PUL genes in these two Bt strains were a result of these genomes only being in a draft stage, we decided to perform comparative genomic hybridization to confirm the absence of these loci in the new Bt strains, using Bt VPI-5482 GeneChips. These hybridization data mirrored the results found by in silico BLAST analysis of the genome sequences (FIG. 4C). These results contrast sharply with the high conservation among the loci involved in HMO-use among *Bif. infantis* and are consistent with degeneracy encoded in Bt's extensive transcriptional response HMO.

Figure 5:
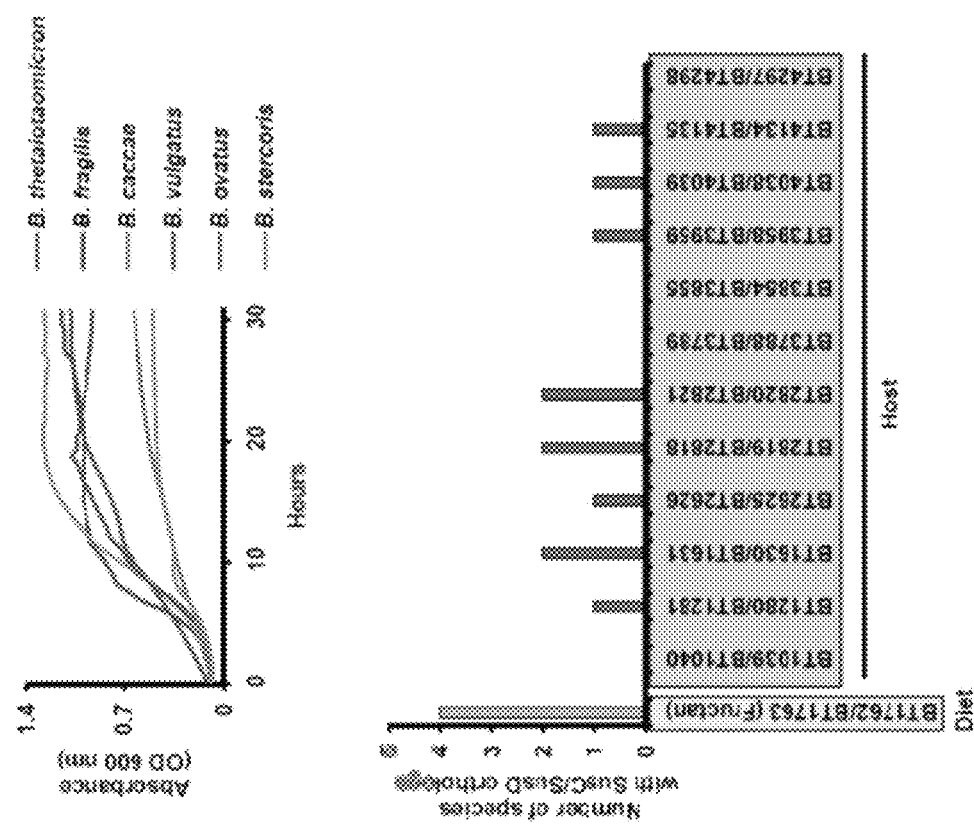
FIG. 5. *Bacteroides* species show minimal conservation in HMO-related PUL genes. A) In vitro growth of six different *Bacteroides* species in MM-HMO B) Number of *Bacteroides* strains from panel A containing orthologs of Bt VPI5482's HMO responsive susC/susD pairs (red bars) or susC/susD pairs within the fructan utilization system (green bars).

*Bacteroides* species display differential abilities and strategies to use HMO. We performed a broad survey of five additional sequenced *Bacteroides* species to determine their ability to use HMO as the sole carbon source, and the relative level of conservation of HMO-utilization loci identified in the Bt type strain. Growth of each species in MM-HMO revealed that *B. fragilis*, *B. vulgatus* and *B. caccae* grow well in this substrate with doubling times comparable to Bt (*B. fragilis* 2.88 h, *B. vulgatus* 3.30 h, *B. caccae* 2.76 h) and reach a high cell density (saturating OD 600>0.9 for each strain) (FIG. 5A). Conversely, *B. ovatus* and *B. stercoris* grew very poorly and did not exhibit exponential growth in MM-HMO, indicating that efficient use of milk oligosaccharides is not universal in gut resident *Bacteroides*.

Figure 12:
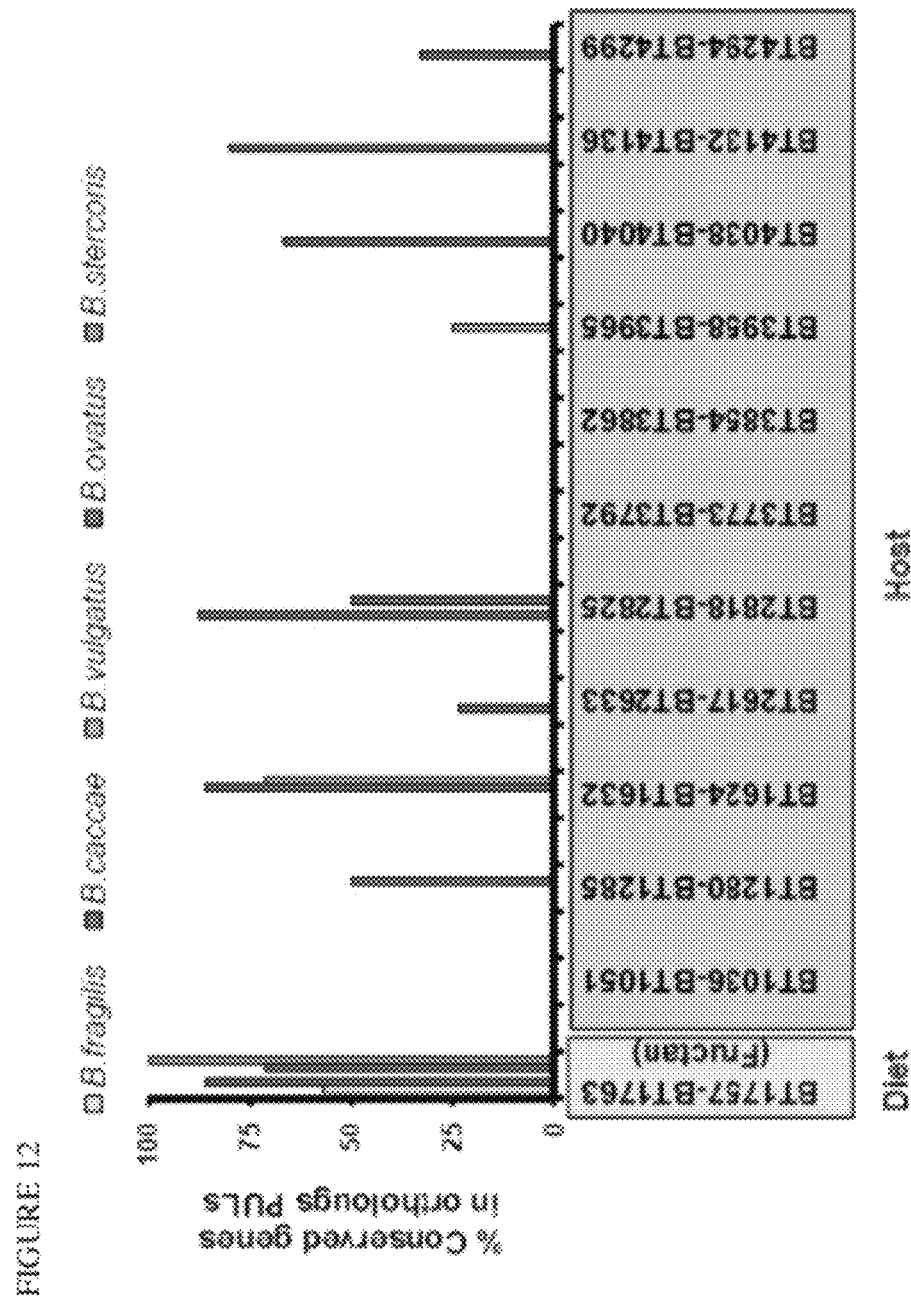
FIG. 12. Analysis of HMO induced Bt PULs in *Bacteroides* genomes. Percentage of genes within Bt's HMO-responsive PULs that are conserved in other *Bacteroides* species.

The HMO-induced Bt susC/susD homologs were used as markers of HMO-utilization genes and complete genome sequences of the five other *Bacteroides* species (*B. fragilis, B. caccae, B. ovatus, B. ovatus* and *B. stercoris*) were searched using BLAST to identify the presence or absence of orthologs (see Materials and Methods). For comparative purposes, we included in the analysis a well-described susC/susD-like pair involved in the use of dietary fructans (BT1762-BT1763). The susC/susD pairs involved in fructan utilization are highly conserved in four out of the five species. In contrast, orthologs of HMO-related susC/susD-like pairs show a much lower level of conservation between the species, with susC/susD pairs having orthologs in zero (four locus), one (five loci), or two (three loci) of the five species. (FIG. 5B). Furthermore, analysis of genes located adjacent to the susC/susD pairs were examined for orthology to Bt genes. Results reveal that in cases where a species shares an orthologous susC/susD pair with Bt, adjacent genes within the PUL show in most of the cases a lack of conservation (FIG. 12). These results suggest that *Bacteroides* species have developed diverse strategies for using HMO as a substrate, and do so with varying levels of efficiency.

*B. fragilis* employs a strategy for HMO use that is distinct from Bt. We next addressed whether *B. fragilis*, which can efficiently utilize HMO, exhibits an expansive transcriptional response similar to that observed in Bt, despite the lack of conservation in the HMO-utilization PULs. Whole genome transcriptional profiling was performed on *B. fragilis* at midlog phase of its monophasic growth in either MM-HMO, MM-lactose, MM-galactose or MM-glucose, using a customized *B. fragilis* GeneChip containing oligonucleotides representing 4151 of the 4299 *B. fragilis* predicted chromosomal protein-coding genes. The transcriptional profiles were analyzed (n=2 replicates per condition) using the MM-glucose dataset as a baseline to define the genes that were up regulated by *B. fragilis* growth in HMO, but not up regulated in MM-lactose or MM-galactose. This analysis revealed a *B. fragilis* response to HMO that involved a much smaller set of genes compared to Bt. Using a 5-fold cutoff value we identified 21 genes specifically up regulated by *B. fragilis* in HMO (See Table S5) compared to 105 genes by Bt that we defined using the same criteria. Just four *B. fragilis* susC/susD-homolog-containing PULs were specifically up regulated during growth in HMO (FIG. 6A) compared to the 13 identified for Bt.

Ten of the 21 genes in the HMO-specific *B. fragilis* response were distributed within two loci that are dedicated to sialic acid acquisition and catabolism (FIG. 6B). This portion of the *B. fragilis* response suggests the use of sialic acids on HMO as a carbon source, which is in contrast to Bt, a species that cannot catabolize this family of monosaccharides [36]. To confirm that *B. fragilis* consumes sialic acids from HMO, sialic acid content in the MM-HMO after growth was measured using derivatization with 1,2-diamino-4,5-methylenedioxybenzene followed by reverse phase HPLC (FIG. 6C). The sialic acid Neu5Ac was completely depleted by *B. fragilis* after growth in HMO. The presence of genes encoding a neuraminidase (nanH, BF1806; 7.8-fold induced in HMO), an N-acetyl neuraminate permease (nanT), N-acetylneuraminate lyase (nanL), and N-acetylmannosamine 2-epimerase (nanE) (BF1714: 5.8-fold; BF1712: 6.9-fold; BF1713: 6.0-fold, respectively) provides *B. fragilis* the machinery necessary to cleave and catabolize Neu5Ac from sialylated glycans.

We wondered if *B. fragilis* exhibited an overlap in the strategies used for accessing HMO and mucin glycans, similar to Bt. We measured the expression of genes that represent the *B. fragilis* response to HMO (BF1712, BF1713, BF1714 and BF1806) in MM supplemented with the O-glycan fraction from porcine mucin (MM-O-PMG; see Methods for description of glycan purification) and MM-glucose using qRT-PCR. We found that all four genes are up regulated in the presence of mucin, confirming that *B. fragilis* up regulates sialic acid use pathways in the consumption of both HMO and intestinal mucin (FIG. 6D). Sialic acid consumption genes appear to be present within the genomes of *B. vulgatus, B. caccae, B. stercoris* and *B. ovatus* (Table S6), which suggests these species employ a strategy similar to *B. fragilis* for cleaving and consuming sialic acids from sialyloligosaccharides.

Figure 7:
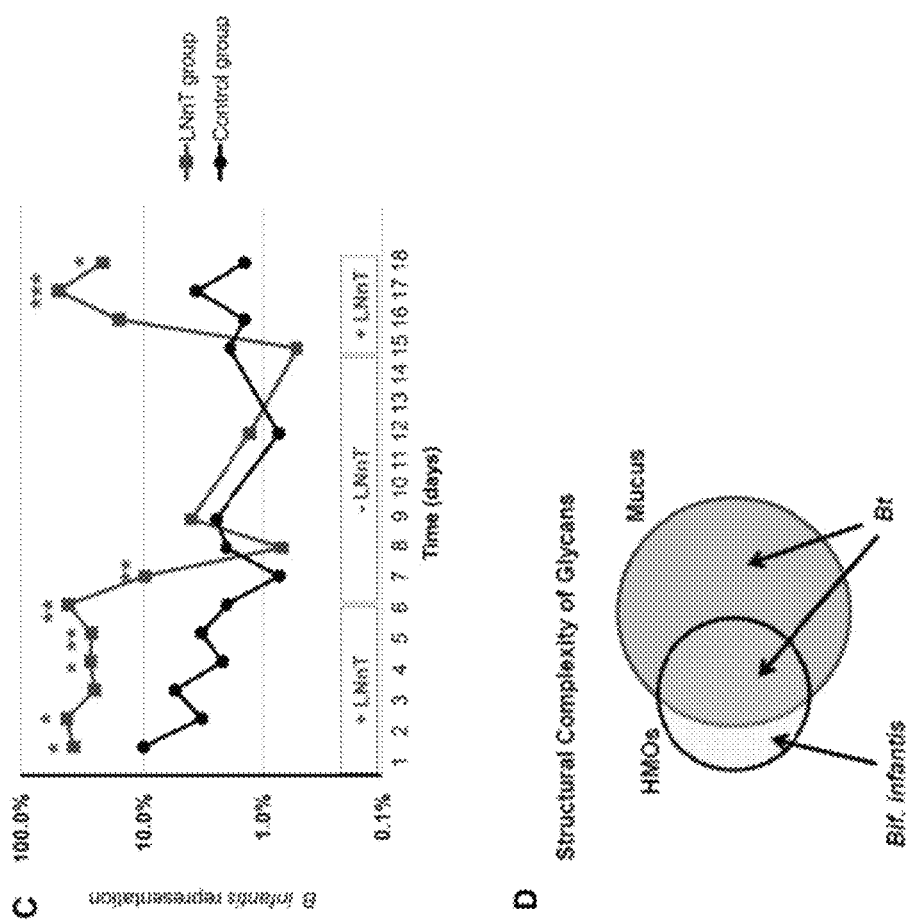
FIG. 7. Comparison of mucin glycans and HMO. A) Schematic of mucin glycans from human, porcine, and murine digestive tract and HMO based on previous reports. For comparative purposes structural information has been divided into the core, backbone, and terminal (fucosylation, sialylation) motifs for each. B) In vitro growth of Bt and *B. infantis* in the presence of MM-O-PMG, MM-HMO, or MMLNnT. C) Bt and *B. infantis* biassociation of adult germfree mice fed a polysaccharide-deficient diet without (black circles) or with LNnT (red squares). Values represent average of fecal communities within each group (n=4 mice/group). D) Venn diagram representing the structural relationship of mucin and milk glycans. HMO include a subset of structures also found in mucus that can be consumed by mucus-adapted mutualists like *Bacteroides* species. *Bif. infantis* appears to be strictly adapted to use of simple structures within the HMO (e.g., LNT) and is therefore unable to utilize the distinct and complex structures found in mucin glycans.

Mucin glycans and HMO have similar structures but are differentially consumed by Bt and *Bif. longum*. Although the mechanism of milk oligosaccharide production by mammary cells is not well understood, it is likely that this secretory tissue utilizes many of the same enzymes that are expressed within the intestine to make mucus. This idea is supported by the similarity of glycan structures between human milk oligosaccharides and intestinal mucins (FIG. 7A). Comparing the structures of HMO and human intestinal mucin glycans it is apparent that HMO exhibit less structural complexity than human intestinal mucin glycans with other minor variations. Mucin glycans are built upon a N-acetyl-galactosamine that is O-linked to serine and threonine residues of the mucin protein. Human mucin glycans are based on five different core structures: core-1 (Galβ1-3GalNAcα1-), core 2 [Galβ1-3(GlcNAcβ1-6)GalNAcα1-], core 3 [GlcNAcβ3-3GalNAc], core 4 [GlcNAcβ1-3(GlcNAcβ1-6)GalNAc] and core 5 (GalNAcα1-3GalNAc) [37,38]. Milk oligosaccharides are elaborated from a galactose of the "core" lactose disaccharide. This galactose residue is analogous to the reducing GalNAc of mucin O-linked glycans in that structures similar to core-3 [GlcNAcβ1-3Gal] and core-4 [GlcNAcβ1-3(GlcNAcβ1-6)Gal] are present.

Figure 13:
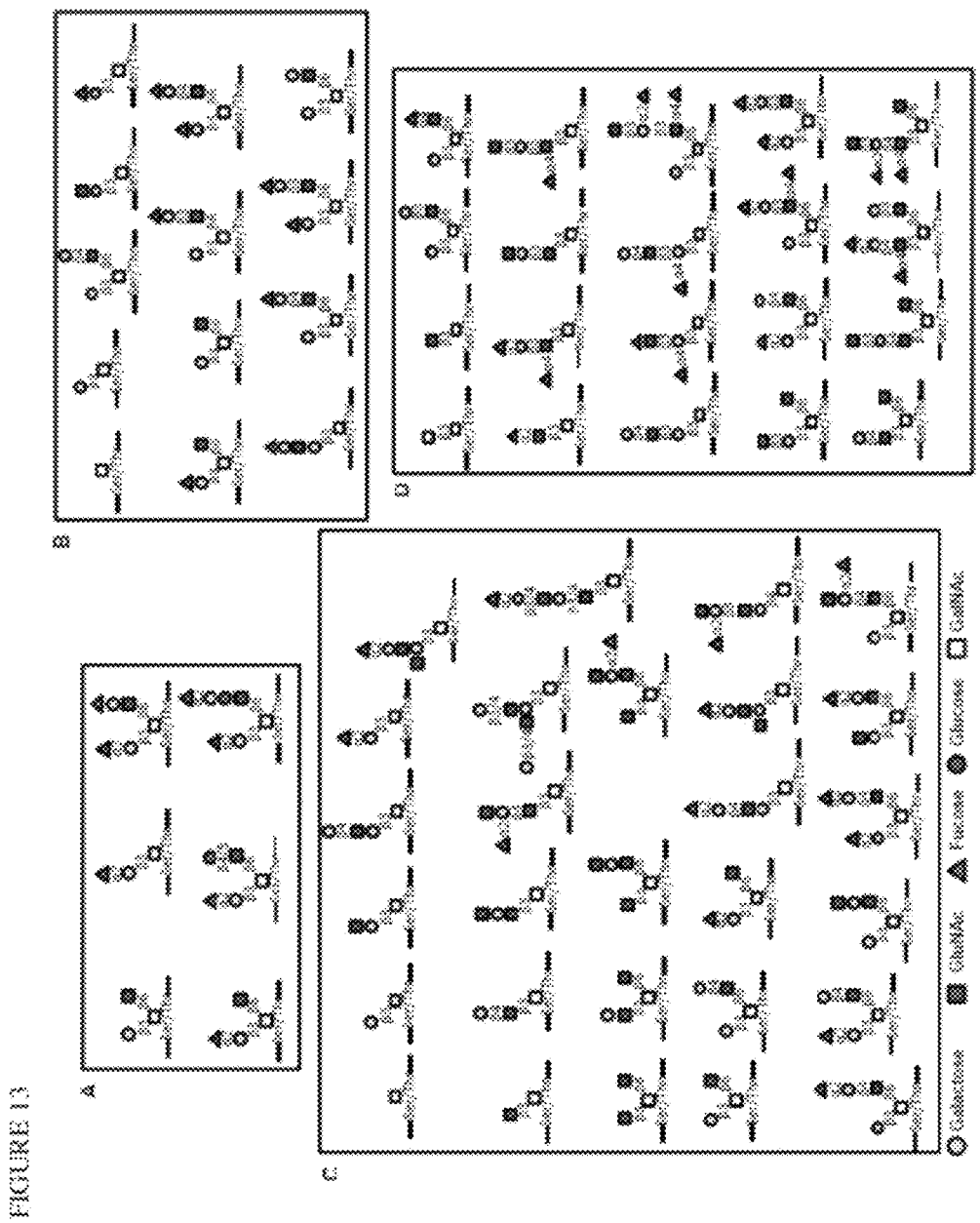
FIG. 13. Mucin glycan structures. A) Schematic of murine glycan structures determined by LX-ESI-MS and LC-ESI-MS/MS reported by Hurd et al. B) Schematic of murine glycan structures determined by GC and GC-MS reported by Thomsson et al. C) Schematic of porcine mucin glycan structures determined by GC-MS and MALDI-MS reported by Karlsson et al. D) Schematic of human intestinal mucin structures determined by GC-MS reported by Robbe et al.

Structures very similar to human mucin glycans are found in porcine mucin glycans, which contain core 1, core 2, core 3 and core 4 based structures, and murine mucin glycans, which contain core 1, core 2 and core 3-based structures (FIG. 7A). In both the intestinal mucins and in HMO, repeated motifs containing galactose and N-acetylglucosamine are present and terminated with fucose and sialic acid residues (See FIG. 13 for complete structures). The extensive structural similarity between HMO and mucins provides a parsimonious explanation for *Bacteroides* species using the same PULs for the utilization of glycans from these two different sources.

We next queried whether the redundancy in machinery employed for mucin and HMO consumption in Bt is also found in *Bifidobacterium* species that are well-adapted to HMO use. Therefore, we grew a strain known to be proficient at HMO-use, *Bif. infantis* ATCC15697 in MM-O-PMG. Despite its proficiency at HMO use, *Bif. infantis* failed to grow in the MM-O-PMG. Together these data suggest that increased complexity of O-PMG compared to HMO prevents this HMO-adapted *Bifidobacterium* strain from consuming mucin, and for the ability of mucin adapted *Bacteroides* strains to use HMO (FIG. 7B).

These results suggest a model in which the structural complexity of HMO is restricted to include structures that represent mucin glycans that may promote colonization of mucin-adapted symbionts, like *Bacteroides*, early in life. HMO also include structures distinct from mucins, such as lacto-N-tetraose, that may provide a niche for species important in microbiota assembly but are not well-adapted to mucus, like *Bif. infantis*, and would otherwise be out-competed by mucus-adapted species like *Bacteroides*. The incomplete overlap of these glycan structural features allows HMO to attract both HMO-adapted *Bifidobacterium* species and mucus-adapted *Bacteroides* species simultaneously (FIG. 7C).

HMO use by Bt and *B. fragilis* results in the induction of PULs that are also used for mucin consumption. It is likely that this overlap in HMO- and mucin-use machinery occurs in other species considering the structural relatedness in HMO and mucin glycans. One important question is which glycan source, HMO or mucin, was the primary selective force shaping locus functionality. In the case of strains that are strictly adapted to one of the glycan sources, the selective pressure can be more confidently assigned, such as *Bif. infantis*' adaptation to HMO. However in the case of Bt, it is less clear whether adaptation to mucin glycans provides extant pathways that may be mobilized for HMO use, or if HMO play a significant role in Bt propagation and provide a selective force, in addition to mucin use, that shape multifunctional loci adapted to accommodate the unique structural aspects of HMO and mucin glycans.

If Bt's entire HMO response is a result of HMO glycans co-opting extant pathways, it is unclear why a subset of Bt's transcriptional response to HMO includes loci that are not induced by mucin use. Considering the more diverse carbohydrate structures that human mucus contains, compared to the pig or mouse mucin glycans used for our analysis, it is possible that the set of Bt genes identified as mucin-glycan responsive is not exhaustive. Specifically, the complete set of Bt genes responsive to human mucus, once defined, may include the loci that now appear to be 'HMO-specific'.

The lack of requirement of the HMO-specific loci, for efficient growth in HMO by Bt, as demonstrated by our gene deletion studies, may appear to support that these loci are not HMO-adapted, but rather are 'tricked' into up regulation by the structurally similar HMO. However, mutation of five mucin-glycan-use PULs in a quintuple KO strain of Bt did not reveal a profound growth phenotype during use of mucin glycans in vitro [24]. Rather, the requirement of these PULs for in vivo adaptation became apparent upon competition with the wt parent strain in the gnotobiotic mouse intestine. Therefore, our results may highlight the caveats associated with assessing the importance of a gene or locus of a gut resident in a non-competitive environment. Unfortunately, due to the paucity of pure HMO, in vivo competition experiments are not currently possible. In addition, the presence of mucin glycans in the intestine, presents an unavoidable confounding factor in testing the importance of these loci in vivo.

We present one model for selective forces that shape HMO structures and the bacterial machinery that utilize these structures. Many selective pressures shape intestinal mucin glycan structures including interactions with enteric pathogens and mutualistic microbiota residents. Several intestinal mutualists, such as *Bacteroides* species, have adapted to use carbohydrates present in the distal intestine including dietary plant polysaccharides and host mucus as carbon and energy sources. These non-pathogenic residents have spent eons co-evolving with host-mucus structures. A mother's attempt to control the rapid and chaotic assembly of a newborn infant's intestinal microbiota by providing milk oligosaccharides to promote colonization by beneficial or benign species may be best accomplished by attracting mucus-adapted bacteria. Implicit in this model is the prospect that pathogenic bacteria are less likely to be well-adapted to mucus utilization. Considering co-evolution between a microbe and host mucus would be expected to result from a long, sustained association, it is probable that sophistication in mucus use is associated with bacteria that are unlikely to cause disease. Therefore, a mother may provide her infant with a selective advantage if her milk oligosaccharides are confined to structures that co-opt extant mucin glycan utilization pathways. In attracting mucin-adapted resident mutualists, the mother may be seeding the community with species, such as *Bacteroides*, that are also well-adapted to dietary glycan use thus preparing the infant microbiota for a smooth transition upon the inevitable introduction of solid food. This possibility is supported by recent metagenomic studies that have revealed an abundance of plant polysaccharide-degrading glycoside hydrolases within the gut microbiomes of breast-fed infants.

Materials and Methods

Bacterial Strains and Culture conditions. Bacterial strains used are listed in Table S7. Type strains for *Bacteroides* species were used unless otherwise indicated. *Bacteroides* species were grown in tryptone-yeast extract-glucose (TYG) medium and minimal medium (MM) as described previously. *Bif. infantis* was grown in Man-Rogosa-Sharpe (MRS) medium (Oxoid LTD., Basingstoke, Hampshire, England) and minima medium consisting of modified MRS, which lacks glucose. Carbon sources were added at 0.5% (w/v), to the respective MM for *Bacteroides* or *Bifidobacterium* with the exception of HMO, which were added at 1.5% (w/v). OD600 was monitored using a BioTek PowerWave 340 plate reader (BioTek, Winoosky, Vt., United States) every 30 min, at 37° C. anaerobically (6% $H_2$, 20% $CO_2$, 74% $N_2$).

HMO and porcine mucin glycan purification. HMO purification was performed as described by Ward et al. from samples provided by the Milk Bank of San Jose, Calif., and Austin, Tex. Briefly, lipids were removed by centrifugation and the lipid phase was re-extracted two times with ddH2O. Proteins were precipitated from the pooled aqueous phases with 95% ethanol-water (2:1, v/v) and washed twice. β-galactosidase from *Kluyveromyces fragilis* (Sigma-Aldrich) was added to the pooled extracts to hydrolyze lactose into monosaccharides. Oligosaccharides were isolated using solid phase extraction with a graphitized non-porous carbon column (Sigma-Aldrich). Determination of the monosaccharides, fucose, galactose, glucose, N-acetylglucosamine and mannose in HMO was determined by HPAEC-PAD analysis, at the Glycotechnology Core Facility UCSD (University of California, San Diego, Calif., United States) (see Table S8). HMO samples were analyzed before and after acid hydrolysis (at 80° C. for 3 hours in 2M acetic acid).

Porcine mucin glycans (PMG) were purified from pocine gastric mucin Type III, (Sigma-Aldrich) as described previously with slight modifications. Briefly, a 2.5% (w/v) solution of porcine gastric mucin in 100 mM Tris pH7.4 was autoclaved for 10 min at 121° C. The solubilized mucin was cooled to 60° C. and proteinase K was added to 0.01% (w/v). The proteolyzed mucin was incubated for 16-20 h and centrifuged at 21,000×g to remove insoluble material. NaOH was added to a final concentration of 0.15M, $NaBH_4$ was subsequently added to a final concentration of 1M, and the solution was incubated at 55° C. for 16-20 h to release O-glycans from the mucin glycoproteins. The solution was neutralized to pH7.4, dialyzed exhaustively against water (1 kDa mw cutoff) and concentrated by lyophilization prior to chromatography on a DEAE-cellulose column. Neutral mucin O-glycans are defined as the material that was unbound by the DEAE-cellulose in the absence of any NaCl.

Whole Genome Transcriptional Profiling. Transcriptional profiling of Bt and *B. fragilis* was performed in MM supplemented with milk oligosaccharides, glucose, galactose and lactose (Sigma-Aldrich). Bt samples profiled in HMO were collected at OD600=0.5 and OD600=0.8. Cultures grown on galactose, lactose and glucose were collected at OD600=0.5. RNA targets were prepared and hybridized to custom Bt Affymetrix GeneChips or *B. fragilis* GeneChips as previously described. *B. fragilis* GeneChips were manufactured by Affymetrix based on the complete genome of *B. fragilis* NC9343. Validity of all *B. fragilis* probesets was checked by hybridizing 10, 50 and 100 ng of 3' terminal labeled genomic DNA from *B. fragilis* NCTC9343 in two replicates. Before hybridization, the fragments were fragmented using 0.6 units of DNAsel (Promega, Madison, Wis., United States) at 37° C.

for 20 minutes, and labeled with biotin (Enzo BioArray Terminal Labeling Kit, Affymetrix). The GeneChips were hybridized, washed and scanned at the Center for Integrated Biosystems (USU, Logan, Utah, United States) following standard manufacturer's protocol. The raw data were RMA-MS normalized as described by Stevens et al. and log 2 transformed. A probeset was considered valid if it hybridized above the background as determined by PANP and if the correlation coefficient ($r^2$) of the linear regression of the log 2 intensities vs DNA concentration was above 0.90. 4145 out of 4151 probesets passed both these criteria and were further analyzed. GeneChip data from bacteria growth in different carbon sources were normalized using R program by RMA-MS and statistical significance for differential gene expression was determined using SAM [45]. Results were visualized using DNA-Chip analyzer v1.3 (dChip). Cluster of orthologous groups assignments were performed based on NCBI COG assignments for Bt. All GeneChip data are available from the Gene Expression Omnibus (GEO) database.

Genetic Manipulation of Bt. Genetic manipulation of Bt was performed using counter-selectable allele exchange resulting in "in-frame" gene deletion as described previously, using primers listed in Table S9, and ligated into the pNBU2-Erm vector. Conjugation was performed via *E. coli* 517.1 λ-pir. Bt strains were grown on brain-heart infusion (BHI) (Becton and Dickinson, Sparks, Md., United States) agar supplemented with 10% horse blood (Colorado Serum Co., Colorado, United States). Antibiotic were added as following: erythromycin (25 μg/ml), gentamicin (200 μg/ml), tetracycline (2 μg/ml) and 5-fluoro-2'-deoxyuridine (FUdR, 200 μg/ml). Clones were screened by PCR and confirmed by sequencing.

Glycoprofile analysis of HMO consumption. Bacteria culture supernatants in MM-HMO were collected by centrifugation. Remaining oligosaccharides were recovered as described. Briefly, supernatants were boiled for 5 min, filtered and reduced using 1:1 (v/v) of 2.0 M sodium borohydride. Deuterated HMO were added as internal standard and analysis was performed by MALDI-FTICR-MS as described previously. The ratio of deuterated species to undeuterated species (D/H) and percent of consumption was calculated according to Ninonuevo et al. for the 16 most abundant HMO signals present in the spectra.

Quantitative RT-PCR Analysis. Quantitative RT-PCR was performed using gene-specific primers listed in Table S9. Total RNA (1-10 μg) was isolated from cells during exponential phase and reverse transcribed using the Superase IN (Ambion, Austin, Tex., United States) and Superscript-II RT (In-vitrogen, Carlsbad, Calif., United States) according to the manufacturer's protocol, using random primers (10 μM final concentration, Invitrogen). cDNA was amplified using SYBR Green reagent (Applied Biosystem, Foster City, Calif., United States) in a M×3000P QPCR System instrument (Stratagene, La Jolla, Calif., United States).

Sialic acid content determination. *B. fragilis* culture supernatant was isolated after growth in MM-HMO and clarified by centrifugation and filtration. Sialic acid concentrations were determined by the Glycotechnology Core Facility UCSD (University of California, San Diego, Calif., United States). Briefly, sialic acids were released by acid hydrolysis at 80 C for 3 hours in 2M acetic acid, collected by ultra-filtration, and derivatized with DMB (1,2-diamino-4,5-methylenedioxybenzene). The resulting fluorescent sialic acids derivatives were analyzed by RP-HPLC with on-line fluorescence detection, and identification was based on standards run in parallel.

Comparative genomics among Bt strains. Genes homologous to relevant Bt VPI-5482 PULs in other Bt strains (Bt VPI-3731 and Bt VPI-7330) were identified by BLAST. To confirm BLAST hits, comparative genomic hybridization was performed using Bt VPI-5482 Affymetrix GeneChips as follows: Genomic DNA from Bt VPI-3731 and Bt VPI-7330 was extracted and fragmented using 0.6 units of DNaseI (Promega) at 3TC for 20 minutes. DNA fragments were labeled using Biotin (Enzo BioArray Terminal Labeling Kit) and subsequently hybridized to the GeneChip. Scanning was performed at the Proteins and Nucleic Acid Facility (Stanford, Calif., United States) and results analyzed using AGCC software (Affymetrix).

Homologous identification in *Bacteroides* species. Orthologs of Bt SusC/SusD like genes up regulated in the presence of HMO were identified in *B. fragilis* NCTC9343, *B. caccae* ATCC43185, *B. vulgatus* ATCC8482, *B. ovatus* ATCC8483 and *B. eggerthii* DSM20697 as bidirectional best hits from BLASTP of Bt genome against other genome, using e value cutoff of <$1e^{-50}$. The same criteria were used to search for orthologs of other genes within a given PUL. Genes homologous to *B. fragilis* NCTC9343 sialic-acid catabolism genes were found in other *Bacteroides* genomes using BLASTP with an e value cutoff of $1e^{-100}$.

EXAMPLE 2

Figure 14:
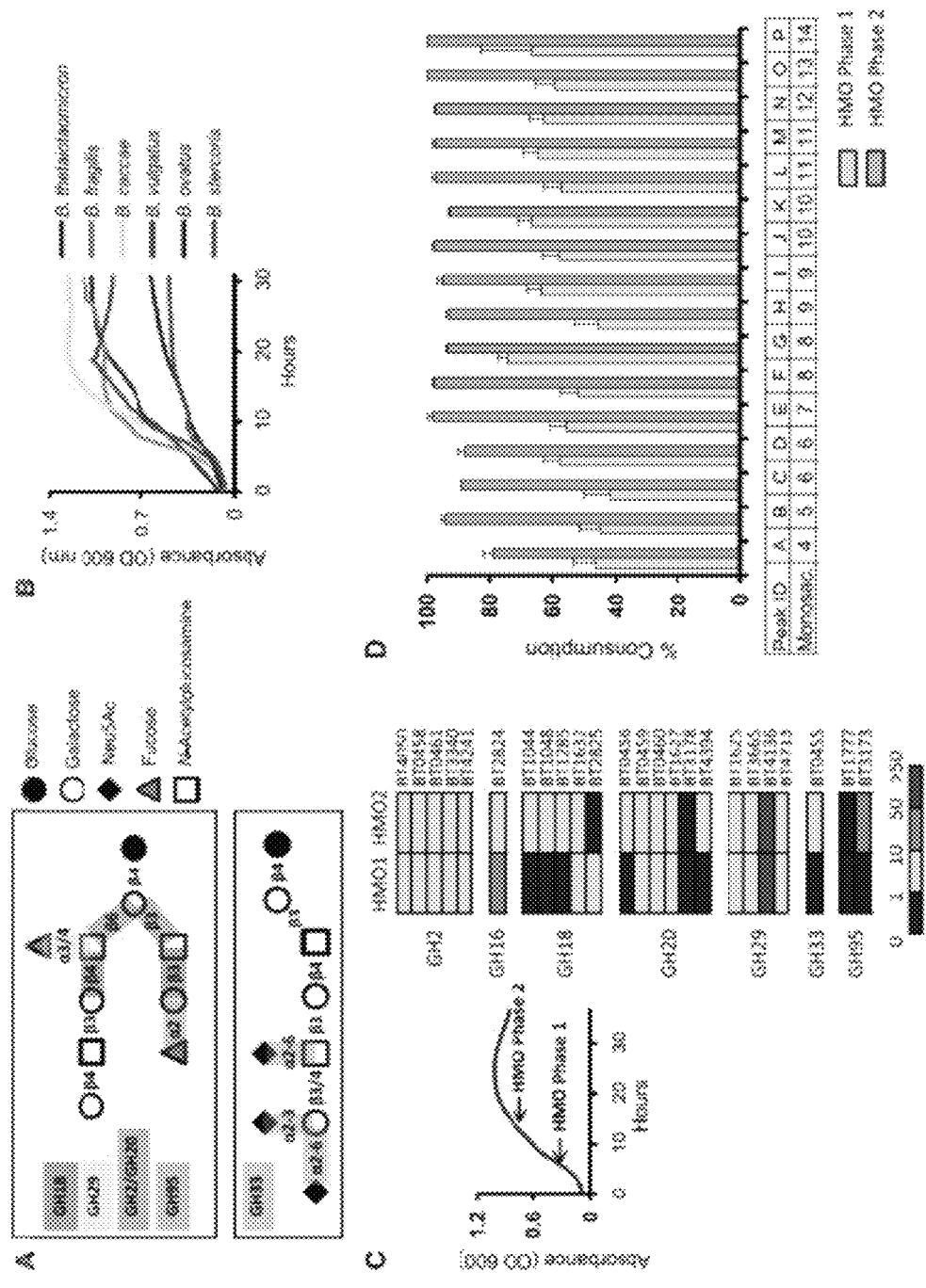
FIG. 14. B. thetaiotaomicron Upregulates Numerous Glycoside Hydrolases during Consumption of HMO (A) Schematic of HMO linkages (branched, top box; linear, bottom box) and putative HMO active glycoside hydrolase families (GH). Linkages are to the 1-carbon of the underlying sugar unless otherwise noted. (B) In vitro growth of *Bacteroides* species in MM-HMO. (C) Bt gene expression at two time points (HMO1, HMO2) in MM-HMO relative to MM-glucose for 24 putative HMO active GHs (predicted to hydrolyze linkages found in milk glycans in A). (D) Bt HMO consumption at two time points (HMO1, HMO2), determined by MALDI-FTICR-MS. Peak IDs correspond to a characteristic oligosaccharide, with the following discrete mass to charge ratios (m/z): A, 732.25; B, 878.31; C, 1024.36; D, 1097.38; E, 1243.44; F, 1389.50; G, 1462.51; H, 1535.55; I, 1608.57; J, 1754.63; K, 1827.64; L, 1900.69; M, 1973.70; N, 2119.76; O, 2265.82; P, 2484.89. Number of monosaccharides for each mass is indicated. Error bars represent standard deviation for three biological replicates.

*B. thetaiotaomicron* Exhibits an Expansive Glycoside Hydrolase Response during Consumption of HMOs In Vitro. Bt possesses a repertoire of predicted glycoside hydrolases (GH) capable of accommodating the structural diversity found in milk oligosaccharides. Among Bt's >260 glycoside hydrolases, 67 make up six GH families with predicted activities required to process linkages found in HMOs (FIG. 14A). Bt grows efficiently when cultured in minimal medium containing HMO (1.5% w/v; MM-HMO) as the sole carbon source. Five additional sequenced *Bacteroides* species, Bf, *B. caccae*, *B. vulgatus*, *B. ovatus*, and *B. stericoris*, all grow in the presence of HMOs. Growth of Bf, *B. vulgatus*, and *B. caccae* are comparable to that of Bt (doubling times of 2.9 hr, 3.3 hr, and 2.8 hr, respectively; saturating OD600>0.9 for each strain). *B. ovatus* and *B. stercoris* do not exhibit exponential growth in MMHMO, indicating that efficient use of milk oligosaccharides is not universal in the gut resident *Bacteroides* (FIG. 14B).

We identified the Bt genes induced by HMOs using transcriptional profiling of Bt during growth in MM-HMO at the midpoints of the two logarithmic growth phases, using a Bt GeneChip (n=2 biological replicates/growth phase, four datasets total) (FIG. 14C). As a baseline for comparison, we used previously reported data of Bt grown in MM-glucose. A total of 156 genes are significantly upregulated during the first phase, and 230 genes are upregulated during the second phase, relative to MM-glucose. Forty-six genes of the 253-gene response to HMOs are predicted to encode glycoside hydrolases, and over half of those (24 genes) belong to the seven GH families that target the most common linkages found within HMOs (FIGS. 14A and 14C). The biphasic growth of Bt in MM-HMO suggests a sequential, ordered degradation of glycans.

We used laser desorption/ionization coupled with mass spectrometry to characterize the consumption of 16 structurally defined neutral milk oligosaccharides, which represents >85% of the total HMO pool. After the completion of each exponential phase, HMOs were purified from culture supernatants, reduced, and profiled. During the first growth phase, Bt consumes the full spectrum of HMOs; a slight preference for larger oligosaccharides is apparent (FIG. 14D). After the second phase all the glycans are depleted >80%, with the exception of the smallest oligosaccharide mass (FIG. 14D, Peak A), which corresponds to two isomers present at high concentration in the HMO pool: lacto-N-tetraose (LNT, Galb1-4GlcNAcb1-3Galb1-4Glc) and LNnT (Galb1-3GlcNAcb1-3Galb1-4Glc). Bt exhibits no preference for fucosylated or nonfucosylated glycans. These data demonstrate Bt's capacity to utilize of a broad range of HMOs, adding to its previously described saccharolytic capacity for mucus glycans and plant polysaccharides.

B. thetaiotaomicron HMO Use Is Coupled to Upregulation of Mucin Glycan Degradation Pathways. To identify which portion of the Bt transcriptional response in MM-HMO was due to the complex oligosaccharides versus the simple core sugars, lactose and galactose, we performed transcriptional profiling of Bt grown in MM-galactose and MM-lactose (n=2 mid-log phase for each monophasic growth). Comparison of these data with the baseline MM-glucose revealed 40 and 34 Bt genes are significantly upregulated (>5-fold) in MM-galactose and MM-lactose, respectively. Thirty-two of the 137 genes that were upregulated at least 5-fold in the MM-HMO response were also upregulated in the presence of galactose and/or lactose, consistent with the presence of these simple sugars in the core structures of all HMOs. The 105 genes that were upregulated in either phase of HMO growth and not in MM-galactose or MM-lactose were highly enriched in the COG functional group "carbohydrate metabolism and transport" (32.1% compared with 11% representation across the genome). These data suggest that this 105-gene signature captures the Bt response to the structural complexity within HMOs.

Figure 15:
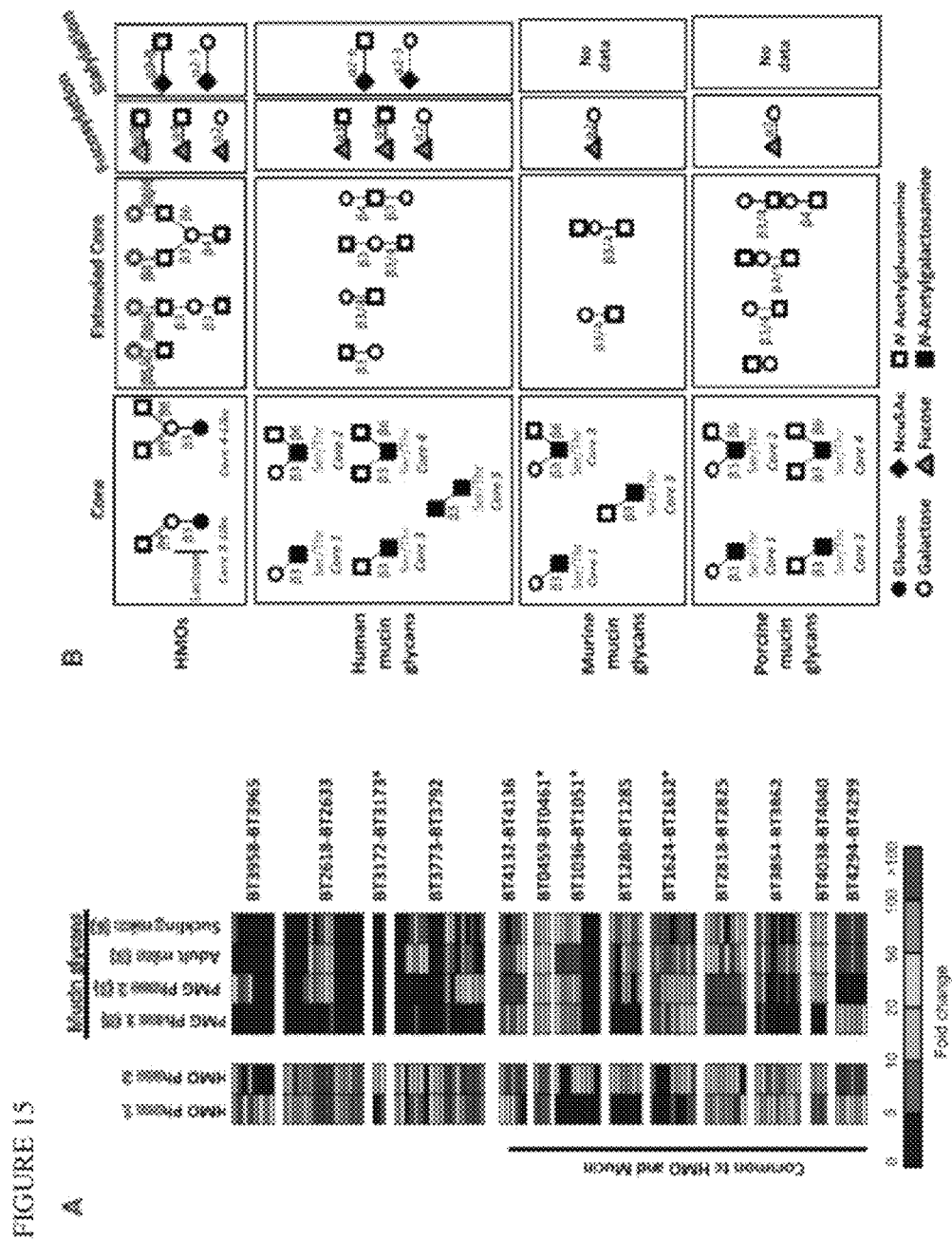
FIG. 15. B. thetaiotaomicron Upregulates Mucus-Utilization Loci during HMO Consumption. (A) Gene expression profile of Bt's induced PULs or partial PULs (*) in MM-HMO, MM-porcine mucin glycans (PMG), or host intestinal glycans from adult or suckling mice relative to MM-glucose. Parentheses denote sample number per condition. (B) Schematic of mucin glycans based on previous reports. Structural information includes the core, extended core, and terminal (fucosylation, sialylation) motifs.

Eighty of the 105 HMO-specific genes are found within ten PULs (loci involved in oligosaccharide acquisition and degradation). The larger 253-gene group that is upregulated in both phases of HMO growth included regions of three additional PULs, which resulted in 13 PULs or partial PULs upregulated in one or both phases of HMO growth (FIG. 15A). Three of these PULs encode putative fucosidases, key enzymes that hydrolyze the terminal fucose residues from HMOs (BT1624-BT1632, BT3172-BT3173, BT4132-BT4136) and three endo-b-N-acetylglucosaminidases. Average fold changes for genes within each PUL or partial PUL ranged from 8- to 173-fold.

Bt profiles in previously defined conditions were examined to search for overlap with the HMO response. Substrate specificities of several Bt PULs have been inferred using growth conditions in which Bt is reliant upon host-derived gut mucus glycans. We compared our in vitro Bt HMO growth expression data with that from three different experimental paradigms in which Bt is reliant upon host mucus glycans: (i) in vitro growth in purified porcine mucus glycans (PMG) (n=3 replicates/growth phase, 2 time points, during exponential phases from biphasic growth); (ii) in vivo Bt-colonized 17-day old gnotobiotic suckling mice (n=6 samples); and (iii) in vivo Bt-colonized adult gnotobiotic mice that were fed a diet lacking complex glycans (n=3 samples). Transcriptional profiles were analyzed using Bt grown in MM-glucose in vitro as a baseline.

Nine of the 13 upregulated PULs or partial PULs in MM-HMO were also highly upregulated (R10-fold induction) in one or more of the conditions of Bt grown in mucin glycans (FIG. 15A). This overlap between HMO- and mucin-induced genes presents the possibility that Bt responds to common structural motifs found in oligosaccharides from mother's milk and intestinal mucin glycans. For instance, in all datasets we observed increased expression of the PUL BT2818-BT2826, which encodes glycoside hydrolases predicted to cleave linkages from Galb-GlcNAcb-Gal, a structure common to HMOs and mucins. Alternatively, four Bt PULs exhibited increased expression specific to HMOs: three complete PULs (BT2618-BT2633, BT3172-BT3173, and BT3958-BT3965) and one partial PUL (BT3172-BT3173) (FIG. 15A). These data indicate that Bt responds to aspects of the milk-derived glycans that are not found appreciably in the mucin preparations.

Comparing the structures of HMOs and human intestinal mucin glycans, it is apparent that HMOs exhibit less structural complexity (FIG. 15B). Mucin glycans are typically built upon an N-acetylgalactosamine that is O-linked to serine and threonine residues of the mucin protein, and the most abundant are based on five different core structures. Milk oligosaccharides are elaborated from a galactose of the "core" lactose disaccharide that is analogous to the reducing GalNAc of mucin O-linked glycans; structures similar to core 3 [GlcNAcb1-3Gal] and core 4 [GlcNAcb1-3(GlcNAcb1-6) Gal] are present in HMOs. Structures very similar to human mucin glycans are found in the porcine and mouse mucin glycans, which have been used experimentally to define Bt's mucus use capability (FIG. 15B). In both the intestinal mucins and in HMOs, repeated motifs containing galactose and N-acetylglucosamine are present and terminate with fucose and sialic acid residues. The extensive structural similarity between HMOs and mucins provides a parsimonious explanation for *Bacteroides* species upregulating the same PULs for the utilization of glycans from these two different sources.

We tested if the HMO-induced PULs are required for HMO consumption by creating Bt mutants in four of the HMO-specific loci. In-frame deletions for the respective susC-like genes, involved in carbohydrate binding, and the fucosidase BT4136 containing PUL (the most upregulated HMO-responsive glycoside hydrolases in Bt) were constructed, but showed no defect in growth in HMOs in vitro. These data indicate that extensive degeneracy exists within Bt's HMO response, which contrasts to the strict requirement of genes within the Bt's fructan-utilization locus.

*B. fragilis* Upregulates a Distinct Set of Mucin-Use Genes when Consuming HMOs. The HMO-induced Bt susC/susD homologs and genes located adjacent to the susC/susD genes were used as markers of HMO-utilization genes to identify the presence or absence of orthologs across five sequenced *Bacteroides* (Bf, *B. caccae, B. ovatus, B. ovatus*, and *B. stercoris*). In cases where a species shares an orthologous susC/susD pair with Bt, adjacent genes within the PUL generally display a lack of conservation. Bf grows efficiently in MM-HMOs (FIG. 14B), but does not show conservation of any of the HMO-utilization PULs identified in Bt. These results suggest that *Bacteroides* species have developed diverse strategies for using HMOs with varying levels of efficiency.

Figure 16:
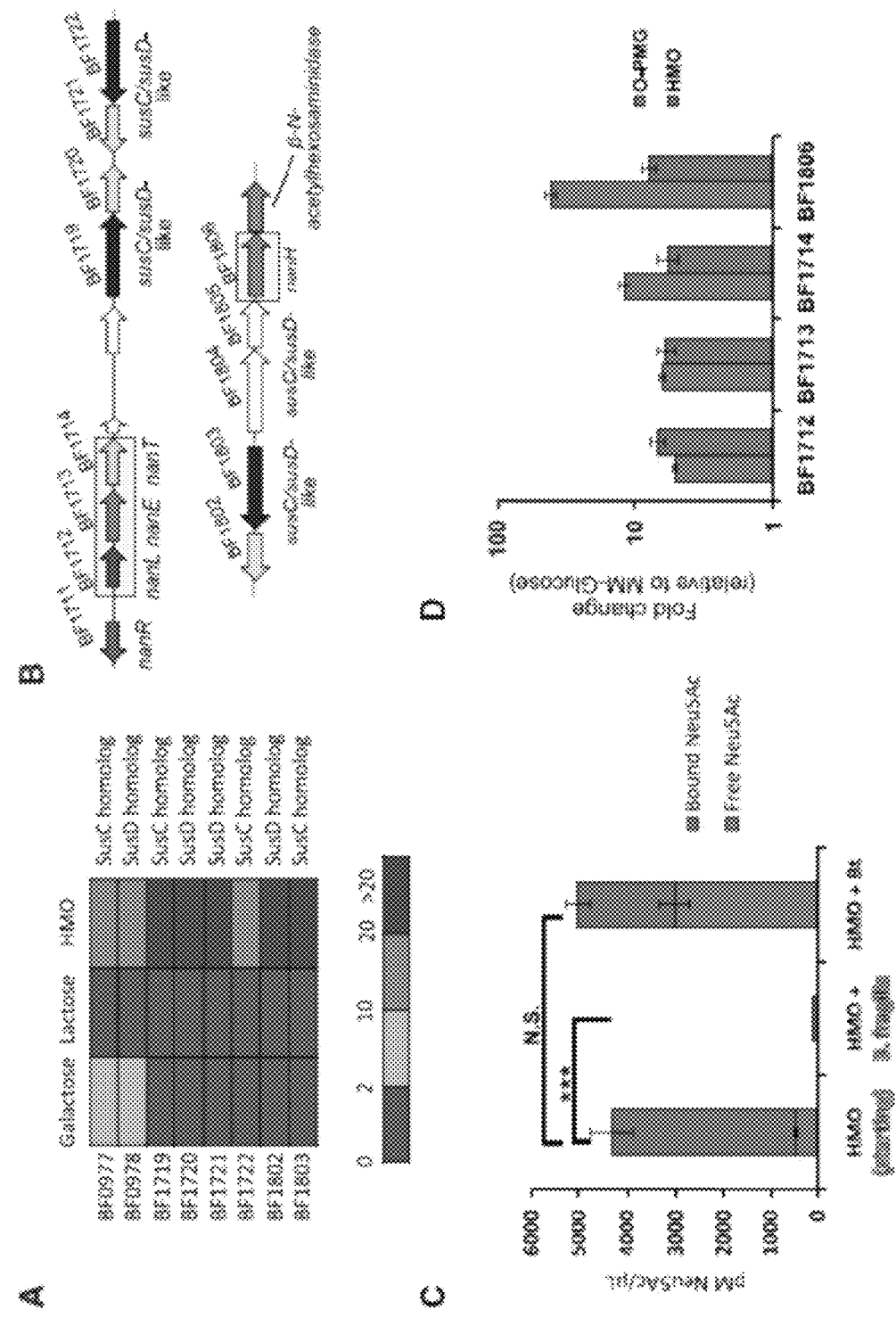
FIG. 16. B. fragilis Response to HMOs Includes Sialic Acid Catabolism (A) Bf susC/susD homologs upregulated (fold change) in vitro in MM-galactose, MM-lactose, and MM-HMO relative to MM-glucose. (B) Genomic organization of Bf genes with >5-fold induction in MM_HMO relative to MM-glucose. Yellow boxes frame genes related to sialic acid consumption. White genes are upregulated <5 fold. (C) HMO-bound versus liberated Neu5Ac content in MM-HMO and in MM-HMO after Bf and Bt growth. Error bars represent standard error for three biological replicates. (D) Fold-induction of sialic acid-related genes from Bf grown in MM-O-PMG and MM-HMO relative to growth in MM-glucose, as measured by qRT-PCR. Error bars represent standard error for three biological replicates.

Whole genome transcriptional profiling of Bf at mid-log phase of its monophasic growth in either MM-HMO, MM-lactose, MM-galactose, or MM-glucose was used to identify the genes upregulated by Bf during HMO consumption. MM-glucose served as a baseline to define the genes that were upregulated in HMO, but were not upregulated in MM-lactose or MM-galactose (n=2 per condition). These data revealed a Bf response to HMO composed of a much smaller set of genes compared to Bt. We identified 21 genes specifically upregulated (>5-fold) by Bf in HMO compared to 105 genes by Bt. Just four Bf susC/susD-homolog-containing PULs were upregulated in HMO compared to 13 in Bt (FIG. 16A). Twelve of the 21 HMO-specific Bf genes were distributed within two loci that are dedicated to sialic acid acquisition and catabolism (FIG. 16B). These genes include a neuraminidase (nanH, BF1806), an N-acetyl neuraminate permease (nanT, BF1724), an N-acetylneuraminate lyase (nanL, BF1712), and an N-acetylmannosamine 2-epimerase (nanE, BF1713) (upregulated 7.8-fold, 5.8-fold, 6.9-fold, and 6.0-fold, respectively) and provide the machinery necessary to cleave and catabolize Neu5Ac from sialylated glycans. To confirm that Bf does in fact consume sialic acids from HMOs, sialic acid content in the MM-HMO after growth was measured before and after acid hydrolysis using derivatization with 1,2-diamino-4,5-methylenedioxybenzene followed by reverse phase HPLC. The sialic acid Neu5Ac was completely depleted by Bf after growth in HMO. In contrast, Bt can cleave Neu5Ac from sialylated HMOs, presumably to access underlying sugars, but is unable to catabolize it (FIG. 16C).

It was determined if Bf exhibited an overlap in the general strategies used for accessing HMOs and mucin glycans similar to that observed in Bt. The expression of genes that represent the Bf response to HMOs (BF1712, BF1713, BF1714, and BF1806) in MM supplemented with the O-glycan fraction from porcine mucin (MM-O-PMG) and MM-glucose was measured by qRT-PCR. We found that all four genes are upregulated in the presence of mucin, confirming that Bf upregulates sialic acid-use pathways in the consumption of both HMOs and intestinal mucin (FIG. 16D). Therefore, while the specific PULs employed for HMO use by Bf and Bt differ, the mobilization of mucin-use PULs for HMO consumption is conserved between these *Bacteroides* species.

Figure 17:
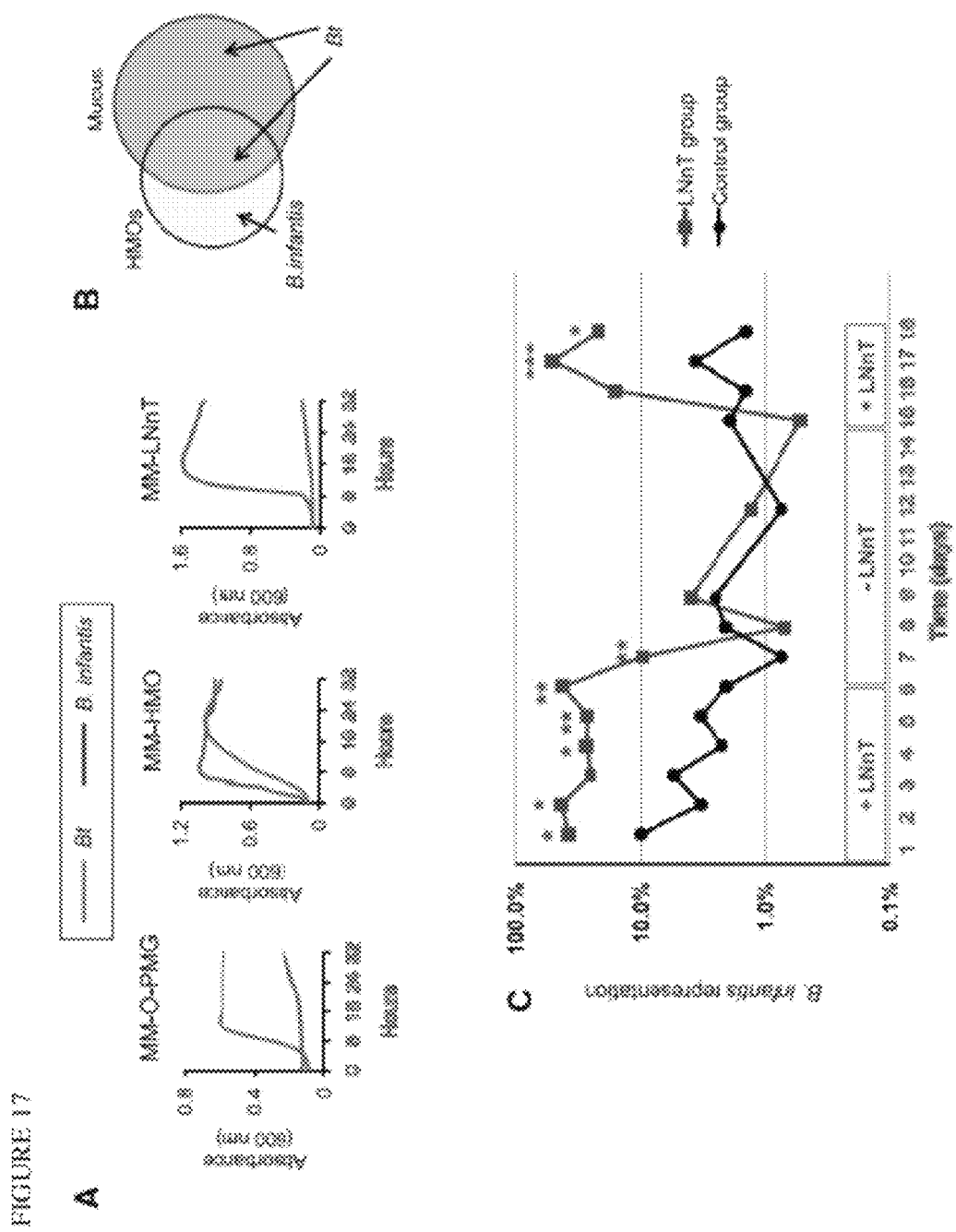
FIG. 17. Selective Use of the HMO Lacto-N-Neotetraose by *B. infantis* Provides In Vivo Advantage (A) In vitro growth of Bt and *B. infantis* in the presence of MM-O-PMG, MM-HMO, or MMLNnT. (B) Venn diagram representing the structural relationship of mucin and milk glycans. HMOs include a subset of structures found in mucus that can be consumed by mucus-adapted mutualists (e.g., *Bacteroides*). *B. infantis* is adapted to use simple structures within HMOs (e.g., LNnT) and is unable to use the structures found in mucin glycans. (C) Bt and *B. infantis* biassociation of adult germfree mice fed a polysaccharide-deficient diet without (black circles) or with LNnT (red squares). Values represent average of fecal communities within each group (n=4 mice/group).

*B. thetaiotaomicron* and *Bifidobacterium infantis* Differentially Consume the Structurally Similar Mucin Glycans and HMO. Previous work has demonstrated that *Bifidobacterium* species are well adapted to HMO use. We grew an HMO-consuming *Bifidobacterium* strain that is abundant in the microbiota of breast-fed infants, Bi, in purified porcine mucin glycans (MM-O-PMG) to elucidate its competence in mucin consumption. Despite its proficiency at HMO use, Bi fails to grow in the MM-O-PMG (FIG. 17A). These data suggest that structures unique to HMOs (i.e., not found in mucin glycans) are responsible for supporting growth of the HMO-adapted *Bifidobacterium* strain. Bi has previously been shown to exhibit a preference for the smaller oligosaccharides found in HMOs, some of which are structurally distinct from mucin glycans. One such simple oligosaccharide is the four-sugar LNnT (Galb1-3GlcNAcb1-3Galb1-4Glc).

Therefore, we grew both Bt and Bi in a pure preparation of this single human milk oligosaccharide (MM-LNnT). Bi grew efficiently reaching a high OD, while Bt did not (FIG. 16A). These results suggest a model in which the structural complexity of HMOs includes structures that represent mucin glycans that may promote colonization of mucin-adapted symbionts, like *Bacteroides*, early in life. HMOs also contain structures distinct from mucins, such as LNnT, which may provide a niche for species that are important in microbiota assembly but that are not well adapted to mucus, like Bi, and would otherwise be outcompeted by mucus-adapted species like *Bacteroides*. The incomplete overlap of these glycan structural features allows HMOs to attract both HMO-adapted *Bifidobacterium* species and mucus-adapted *Bacteroides* species simultaneously (FIG. 16B).

We performed an in vivo experiment to test whether LNnT could exhibit selectivity in vivo, enabling the expansion of a *Bifidobacterium* species in the presence of a *Bacteroides* species. Two groups of 6-week-old germ-free mice were fed a polysaccharide-deficient diet, forcing a reliance on host mucus glycans for carbon and energy. One group received LNnT supplementation in the water (1% w/v; average consumption of 75 mg of LNnT daily), the control group received plain water.

After one day of LNnT feeding, both groups were colonized with equivalent quantities of Bt and Bi (108 CFU each). At day 6 post-inoculation, the group receiving LNnT was switched to normal water; at day 15 post-inoculation, LNnT was readministered for 3 additional days. Total bacterial colonization density was determined by assessing the CFUs in feces over the course of the 18 day experiment. The administration of LNnT resulted in an expanded population of Bi relative to Bt throughout the first period (day 1-6) compared to control (41.5±6.4% versus 2±0.5% on day 6; p=0.009, day 6, n=4 mice) (FIG. 16C). LNnT supplementation was withdrawn on day 6 and colonization density was determined on days 7, 8, 9, 12, and 15 post colonization (1, 2, 3, 6, and 9 days after removing LNnT from the water). Removal of LNnT resulted in a drop in Bi to levels similar to controls within 2 days. At day 3 post withdrawal of LNnT, Bi representation was 3.9±0.2% compared to 41.5±6.4% just prior to withdrawal (p=0.006, day 6 versus day 9, n=4 mice). LNnT was reintroduced into the water on day 15, and bacterial colonization was monitored at days 16, 17, and 18 post colonization. Two days after LNnT reintroduction, Bi expanded from 0.5±0.5% at day 15 to 49.9±2% at day 17 (p=0.012, day 15 versus day 17, n=4 mice). By day 18, Bi represented 25.9±9.6% of the community in LNnT-fed mice, compared to 1.9±1.5% in the control group (p=0.014, n=4 mice) (FIG. 16C). These results confirm that this short milk oligosaccharide provides a selective advantage to a *Bifidobacterium* species over a *Bacteroides* species in vivo.

HMO structures may mimic mucus glycans to attract mucin-adapted resident mutualists to an infant microbiota. Attraction of *Bacteroides* may provide the additional benefit of seeding the community with species that are also well adapted to dietary glycan use, thus preparing the infant microbiota for a smooth transition upon the introduction of solid food. This is supported by recent metagenomic studies that have revealed an abundance of plant polysaccharide-degrading glycoside hydrolases within the gut microbiomes of breast-fed infants. At the same time, unique structural features of HMOs, such as LNnT, are potentially important in shaping the infant microbiota in ways that are independent of mucus use.

Methods

Bacterial Strains and Culture Conditions. Type strains were used unless otherwise indicated. *Bacteroides* species were grown in tryptone-yeast extract-glucose (TYG) medium and minimal medium (MM). Bi was grown in Reinforced Clostridial Medium (RCM) (Becton Dickinson, MD) and minimal medium consisting of modified de Man-Rogosa-Sharpe medium (MRS) (Oxoid, Basingstoke, Hampshire, UK), which lacks glucose. Carbon sources were added at 0.5% (w/v) to the respective MM for *Bacteroides* or *Bifidobacterium* with the exception of HMO, LNnT, and PMG, which were added at 1.5% (w/v). OD600 was monitored using a BioTek PowerWave 340 plate reader (BioTek, Winooski, Vt.) every 30 min, at 37_C anaerobically (6% $H_2$, 20% $CO_2$, 74% $N_2$).

Whole Genome Transcriptional Profiling. Transcriptional profiling of Bt and Bf was performed in MM supplemented with milk oligosaccharides, glucose, galactose, and lactose (Sigma-Aldrich). Bt samples profiled in HMO were collected at OD600=0.5 and OD600=0.8. Cultures grown on galactose, lactose, and glucose were collected at OD600=0.5. RNA targets were prepared and hybridized to custom Bt Affymetrix GeneChips or Bf GeneChips.

Genetic Manipulation of *B. thetaiotaomicron*. Genetic manipulation of Bt was performed using counterselectable allele exchange, resulting in "in-frame" gene deletion.

Glycoprofile Analysis of HMO Consumption. Bacteria culture supernatants in MM-HMO were collected by centrifugation. Remaining oligosaccharides were recovered and profiled by HiRes matrix assisted laser desorption/ionization-Fourier transform ion cyclotron resonance mass spectrometry (MALDI-FTICR-MS).

Sialic Acid Content Determination. Culture supernatant was isolated after growth in MM-HMO and clarified by centrifugation and filtration. Sialic acid concentrations were determined by the Glycotechnology Core Facility UCSD (University of California, San Diego, San Diego, Calif.), using the Sigma DMB labeling kit protocol (Prozyme, San Leandro, Calif.).

Competitive Colonization of Gnotobiotic Mouse. Germ-free Swiss-Webster mice were reared in gnotobiotic isolators and fed an autoclaved polysaccharide-deficient diet in accordance with A-PLAC, the Stanford IACUC. Mice were biassociated using oral gavage (108 CFU of each species). Subsequent community enumerations from mice were determined from freshly collected feces, by selective plating of serial dilutions in RCM agar and BHI-blood agar supplemented with gentamicin (200 mg/ml). Significant differences between sample groups were determined using Student's t test. Synthetic LNnT (Glycom A/S, Denmark) was purified by crystallization to a final purity of >99%. Characterization was performed using multiple methods, including NMR (1D and 2D) mass spectrometry, and HPLC.

These and other modifications and variations to the present invention may be practiced by those of ordinary skill in the art, without departing from the spirit and scope of the present invention, which is more particularly set forth in the appended claims. In addition, it should be understood that aspects of the various embodiments might be interchanged both in whole and in part. Furthermore, those of ordinary skill in the art will appreciate that the foregoing description is by way of example only, and is not intended to limit the invention so further described in such appended claims. Therefore, the spirit and scope of the appended claims should not be limited to the description of the preferred versions contained therein.

All references cited in this specification, including without limitation all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinency of the cited references.

What is claimed is:

1. An infant formula supplement comprising:
   (i) mammalian mucin glycans released and isolated from the protein component of mammalian mucins purified to comprise less than 10% by weight protein, which mucin glycans are a heterogenous mixture of linear and branched oligosaccharides from about 2 to about 10 saccharide subunits in length, that selectively stimulate growth of desirable gut microorganisms comprising Bacteroides species, wherein the mucin glycans upregulate a set of polysaccharide utilization loci (PULs) in said Bacteroides species similar to those PULs upregulated in response to human milk oligosaccharides (HMO); and optionally (ii) at least one human milk oligosaccharide (HMO).

2. The therapeutic formulation of claim 1, wherein the HMO has a structure distinct from mucin glycans.

3. The therapeutic formulation of claim 1, wherein the HMO is lacto-N-neotetraose (LNnT) or lacto-N-tetraose (LNT).

4. The therapeutic formulation of claim 3, wherein LNnT and/or LNT is present at a ratio of about 1:1-1:20 tetraose to mucin glycan.

5. The infant formula of claim 1, wherein the mucin glycans are isolated from mammalian buccal and gastrointestinal mucins.

6. The infant formula supplement of claim 1, wherein the supplement is a liquid form and the mucin glycans are present in a dose of at least about 0.1 g/liter.

7. The infant formula supplement of claim 1 wherein the supplement is in a dried form, and a unit dose of the mucin glycans is from about 0.1 g to about 25 g.

* * * * *